United States Patent
Stauffer et al.

(10) Patent No.: US 11,399,404 B2
(45) Date of Patent: Jul. 26, 2022

(54) ENABLING CONCURRENT USE OF MULTIPLE CELLULAR NETWORK TECHNOLOGIES

(71) Applicant: Google LLC, Mountain View, CA (US)

(72) Inventors: Erik Richard Stauffer, Sunnyvale, CA (US); Jibing Wang, San Jose, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/760,672

(22) PCT Filed: Nov. 9, 2018

(86) PCT No.: PCT/US2018/060098
§ 371 (c)(1),
(2) Date: Apr. 30, 2020

(87) PCT Pub. No.: WO2019/094770
PCT Pub. Date: May 16, 2019

(65) Prior Publication Data
US 2020/0296787 A1    Sep. 17, 2020

Related U.S. Application Data

(60) Provisional application No. 62/583,930, filed on Nov. 9, 2017.

(51) Int. Cl.
*H04W 76/16* (2018.01)
*H04L 5/00* (2006.01)
(Continued)

(52) U.S. Cl.
CPC .......... *H04W 76/16* (2018.02); *H04L 5/0051* (2013.01); *H04L 25/0226* (2013.01);
(Continued)

(58) Field of Classification Search
CPC ...... H04B 7/024; H04L 5/0035; H04W 76/15; H04W 76/16; H04W 88/06; H04W 92/20
See application file for complete search history.

(56) References Cited

U.S. PATENT DOCUMENTS

| 2014/0086127 A1 | 3/2014 | Kim et al. |
| 2015/0215840 A1 | 7/2015 | Yiu et al. |

(Continued)

FOREIGN PATENT DOCUMENTS

| KR | 20170039175 | 4/2017 |
| WO | 2017082780 | 5/2017 |
| WO | 2019094770 | 5/2019 |

OTHER PUBLICATIONS

"International Preliminary Report on Patentability", PCT Application No. PCT/US2018/060098, dated May 22, 2020, 7 pages.

(Continued)

*Primary Examiner* — Pao Sinkantarakorn
(74) *Attorney, Agent, or Firm* — Colby Nipper PLLC

(57) ABSTRACT

Methods, systems, and apparatus, including machine-readable media storing executable instructions, for enabling concurrent use of multiple cellular network technologies. In some implementations, a system includes a first wireless base station configured to support a first wireless connection providing uplink and downlink data transfer to a user device. The system includes a second wireless base station configured to support a second wireless connection providing at least downlink data transfer to the user device. The system includes a communication interface between the first wireless base station and the second wireless base station. The system includes a first scheduler, coupled to the first wireless base station, configured to schedule uplink timeslots such that the user device can use a single radio to concurrently communicate with the first wireless base station using the (Continued)

first wireless connection and with the second wireless base station using the second wireless connection.

26 Claims, 10 Drawing Sheets

(51) Int. Cl.
*H04L 25/02* (2006.01)
*H04W 72/04* (2009.01)
*H04W 72/12* (2009.01)
*H04W 80/02* (2009.01)

(52) U.S. Cl.
CPC ... *H04W 72/0446* (2013.01); *H04W 72/1263* (2013.01); *H04W 80/02* (2013.01)

(56) References Cited

U.S. PATENT DOCUMENTS

| | | | |
|---|---|---|---|
| 2016/0050054 A1* | 2/2016 | Wager | H04L 5/0035 455/450 |
| 2016/0135174 A1* | 5/2016 | Lee | H04W 76/10 370/329 |
| 2016/0164622 A1* | 6/2016 | Yi | H04L 5/14 370/280 |
| 2016/0197671 A1 | 7/2016 | Hwang et al. | |
| 2016/0255551 A1 | 9/2016 | Susitaival et al. | |
| 2017/0013610 A1 | 1/2017 | Lee et al. | |
| 2017/0257183 A1 | 9/2017 | Vikberg et al. | |
| 2018/0049230 A1 | 2/2018 | Moradi | |
| 2018/0227911 A1* | 8/2018 | Belghoul | H04W 74/0816 |
| 2018/0368199 A1* | 12/2018 | Zeng | H04W 88/10 |
| 2021/0143963 A1* | 5/2021 | Matsuda | H04L 5/0053 |

OTHER PUBLICATIONS

"5G Ran Interfaces and eCPRI", nomor.de; retrieved from http://nomor.de/2017/5g-ran-architecture-interfaces-and-ecpri-2/# on Apr. 30, 2020, Sep. 2017, 1 page.

"5G; Study on New Radio (NR) Access Technology", ETSI TR 138 912; V14.0.0; Technical Report; 3GPP TR 38.912 version 14.0.0 Release 14, May 2017, 77 pages.

"CWTS specification TS C105", TSG-RAN Working Group 1 meeting#7bis; TSG R1(99)F41; CWTS WG1; Kyoungju, Korea, Oct. 1999, 19 pages.

"Foreign Office Action", IN Application No. 202047018690, dated Jun. 26, 2021, 6 pages.

"Foreign Office Action", EP Application No. 18839777.2, dated Jul. 2, 2021, 6 pages.

"International Search Report and Written Opinion", PCT Application No. PCT/US2018/060098, dated Apr. 23, 2019, 14 pages.

Rosa, et al., "Dual Connectivity for LTE Small Cell Evolution: Functionality and Performance Aspects", IEEE Communications Magazine Jun. 2016, Jun. 2016, 7 pages.

* cited by examiner

Carrier Aggregation Split

Dual Connectivity Split – Split Bearer

Dual Connectivity Split – Separate Bearers

ENABLING CONCURRENT USE OF MULTIPLE CELLULAR NETWORK TECHNOLOGIES

TECHNICAL FIELD

This document generally relates to enabling concurrent use of multiple network technologies.

SUMMARY

In some implementations, a system coordinates data traffic and control messages among base stations that use different network standards or technologies. For example, the system can enable user equipment to use shared radio components to communicate using the multiple network technologies, and to maintain concurrent connections using the multiple network technologies with the shared radio components.

As wireless communication technology advances, new standards are developed and adopted. Generally, it is desirable for networks to maximize performance and also support connections with user equipment that has limited capabilities. Network infrastructure can enable operating modes that concurrently use different cellular network technologies to enhance service for user equipment and minimize hardware requirements for the user equipment. For example, core network infrastructure can coordinate between base stations of different technologies to allow a user device to transmit over an uplink connection to a base station using one technology, but receive data over a downlink connection with a base station using another technology. As discussed below, these coordination techniques and network architectures can allow a user device to use a single transmit chain for both 4G (e.g., $4^{th}$ generation and/or long term evolution (LTE)) communications and 5G (e.g., $5^{th}$ generation new radio or "5G NR") communications.

For many mobile devices that use cellular network connections, it is desirable to make the mobile devices as small as possible and to minimize cost and complexity. Many mobile devices operate on battery power and are power-constrained. Including multiple radios would also disadvantageously increase cost and size of a mobile device. As a result, it is often advantageous for a mobile device to include a single radio or transmit chain for multiple cellular network technologies, rather than including multiple transmitters for different network technologies. The techniques discussed herein enable core network infrastructure to support multiple concurrent wireless connections with a single radio of a single mobile device. Concurrent communication or concurrently active connections can be maintained using the techniques behind time-division multiple access (TDMA). For example, a 4G base station and a 5G base station can coordinate uplink timeslot allocations to avoid contention and interleave uplink timeslots that a user device is allocated for the different standards. As another example, one network technology may be used only for downlink data transfer (and in some instances uplink of control information and sounding reference signal information), so that uplink data transfer is performed on the connection for the other network technology. As discussed below, a 5G connection may be used for downlink data transfer, while uplink of 5G data (e.g., related to or part of the 5G data flow) can be sent over a concurrent 4G connection. Other examples are discussed below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
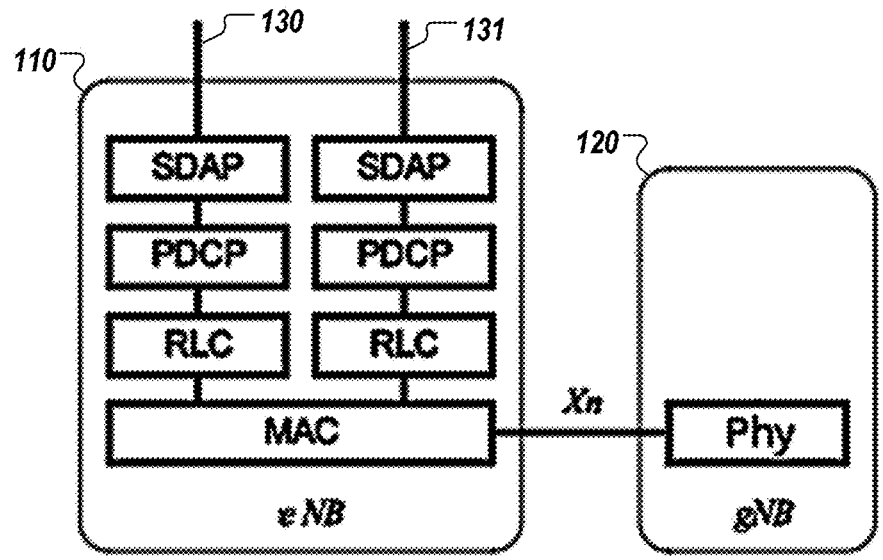
FIGS. 1A-1C are diagrams that illustrate examples of dividing traffic and control among base stations using different cellular network technologies.
Figure 1B:
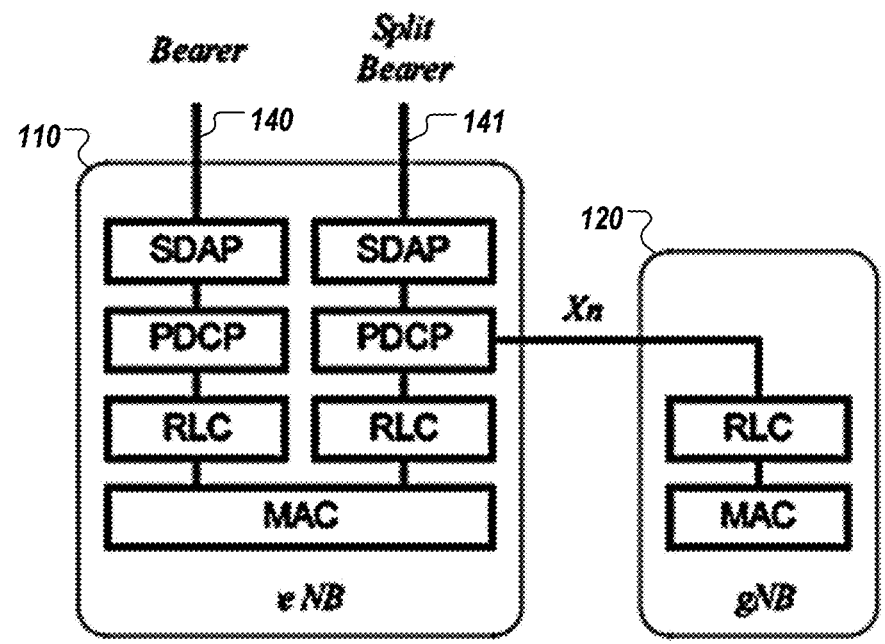
Figure 1C:
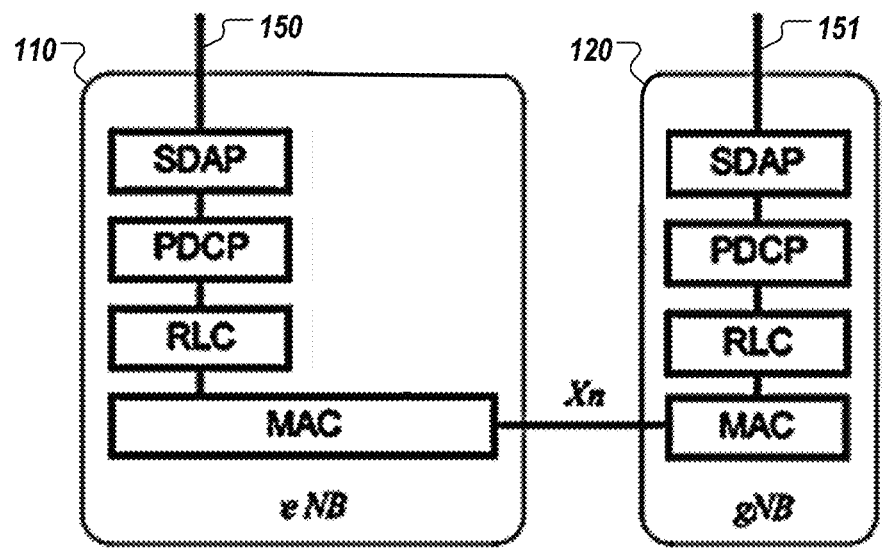

FIGS. 1A-1C are diagrams that illustrate examples of dividing traffic and control among base stations using different cellular network technologies. Each of the figures illustrates two base stations 110, 120. These base stations 110, 120 serve an overlapping geographical area, e.g., substantially the same area, so that user equipment in the area can be served by both base stations concurrently. The first base station 110 is labeled "eNB" to represent an eNodeB cellular base station, such as a 4G or 3G cellular base station. The second base station 120 is labeled "gNB" to represent a gNodeB base station, such as a 5G cellular base station. Thus, the two base stations 110, 120 can operate using different network technologies. In examples discussed herein, the base station 110 represents a 4G base station and the base station 120 represents a 5G base station. However, the same techniques used to coordinate 4G and 5G network connections can also be used to provide concurrent network access using other network technologies.

The techniques discussed herein allow new network technologies to be efficiently used alongside more established network technologies. For example, the techniques can allow 5G base stations to be deployed and used in a limited manner alongside 4G base stations. The coordination among the base stations 110, 120 can enable user equipment to maintain concurrent connections with both base stations even with a single radio or transmit chain. As a result, user equipment does not incur the cost, size, and power consumption penalties of including a different transmitter for each network technology, but still realizes benefits of both network technologies. For example, the user equipment may communicate with the base station 110 for uplink traffic according to the 4G standard, while communicating with the base station 120 for downlink traffic according to the 5G standard. The user equipment can benefit from increased downlink bandwidth that the 5G connection offers, while not requiring separate 4G and 5G transmitters, because uplink data transmissions are made over the 4G connection.

FIGS. 1A-1C illustrate different techniques for coordinating among the base stations 110, 120. Because the two base stations 110, 120 communicate with the same user equipment, and the user equipment may use the same radio for both communications, the base stations 110, 120 alternate time periods in which to communicate with the user equipment. The different techniques in FIGS. 1A-1C show different ways to divide the management of the 4G and 5G data streams and the scheduling of time slots for communicating with a user device. Communication between the base stations 110, 120 can occur over an interface referred to as an Xn interface, which may occur at different network layers (including multiple network layers) depending on the techniques used.

The Xn interface can refer to a control plane interface between the base station 110 and the base station 120. The control plane interface may include, for example, communication using a data link layer (L2 in the OSI model), a network layer (L3 in the OSI model), or a combination of both. In some implementations, the Xn interface is a direct, wired connection between the base station 110 and the base station 120. As shown in FIGS. 1A-1C, the Xn interface may exist at different network layers or components, for example: between media access control (MAC) layer of base station 110 and the physical (PHY) layer of base station 120 in FIG. 1A; between a packet data convergence protocol (PDCP) layer of base station 110 and a radio link control (RLC) layer of base station 120 in FIG. 1B; and between a media access control (MAC) layer of base station 110 and a media access control (MAC) layer of base station 120 for FIG. 1C. The Xn interface may be implemented as a direct, wired interface between the base stations 110, 120, but may also be implemented to include or pass through one or more intervening infrastructure devices.

The example of FIG. 1A shows a carrier aggregation split for 4G and 5G traffic. The base station 110 includes a scheduler (shown in other drawings) that manages 4G traffic and 5G traffic. For example, the base station 110 includes a bearer 130 for the 4G traffic and a bearer 131 for the 5G traffic. The bearers 130, 131 each represent a data flow. FIG. 1A shows that both data flows or data connections can be maintained concurrently with the single user device, although timeslots for actual transmission and reception may be interleaved for the two data flows.

In the arrangement of FIG. 1A, the scheduler of the base station 110 manages 4G data traffic, and also manages the 5G data traffic, although the actual over-the-air transmission is performed by the base station 120. The 4G base station 110 specifies the data to be transmitted by the 5G base station 120 and the schedule for the transmissions by the 5G base station 120. For example, the 4G base station 110 includes the full protocol stack for both 4G and 5G communications. This is shown with a service data adaptation protocol (SDAP) layer, a packet data conversion protocol (PDCP) layer, and a radio link control (RLC) layer for each of the bearers 130, 131, connected to a media access control (MAC) layer. The MAC layer of the 4G base station 110 sends commands directly to the physical (PHY) layer of the 5G base station 120 over the Xn interface, specifying to the base station 120 what to transmit and when. The 5G base station 120 does not include a scheduler or perform any decision making for the timing or content of transmissions. In the open systems interconnection (OSI) model, the L2 layer (e.g., data link layer) of the 4G base station 110 controls the L1 layer (e.g., physical layer) of the 5G base station 120.

In other words, the 5G base station 110 is an extension of the 4G physical layer. The Xn interface connecting the 4G base station 110 to the 5G base station 120 extends the 5G traffic bearer 131 and carrier physical layer (L1) data and control for 5G uplink and downlink. The L2 layer for the 4G base station 110 manages the L1 layer of the 5G base station 120 in addition to L1 layer of the 4G base station 110. There is only one scheduler, which is at the 4G base station 110.

In the arrangement of FIG. 1A, and in carrier aggregation generally as discussed below, only one base station 110, 120 uses a scheduler. For example, the base station 110 may include or otherwise be associated with a scheduler, while the base station 120 does not have a scheduler operating to control this connection. The scheduler for the 4G base station 110 may assign uplink time slots, or in some cases uplink and downlink time slots, for both the 4G base station 110 and the 5G base station 120.

FIG. 1B shows a dual connectivity split for 4G and 5G traffic, using a split bearer. In the dual connectivity split, the 5G base station 120 uses a separate bearer from the 4G base station 110, or the 5G base station 120 has its own connection to the core network. Therefore, the 5G base station 110 has a MAC layer and a PHY layer (not shown). Coordination of uplink opportunities or forwarding uplink traffic goes over the Xn interface.

In this arrangement, the 4G base station 110 and the 5G base station 120 each have a separate MAC layer and scheduler. However, the network stack for the 5G traffic is split between the two base stations 110, 120. A bearer 141 is used for 5G data flow, and this bearer 141 is connected to the MAC of both base stations 110, 120. The PDCP layer of the base station 110 is connected to an RLC layer of the base station 110, and the PDCP layer is also connected to an RLC layer of the 5G base station 120 over an Xn interface. The base station 110 also includes a bearer 140 for 4G data flow. The schedulers for the base stations 110, 120 may set time slots in various ways, such as using a predetermined alternating schedule, or through real-time negotiations based on dynamic needs of the traffic. As an example, the base stations 110, 120 may exchange bit masks indicating the available slots that they would allow the user equipment 210 to transmit, and then adjust to avoid conflicts if any arise.

FIG. 1C shows a dual connectivity split for 4G and 5G traffic, using separate bearers. As with FIG. 1B, the base stations 110, 120 each have a separate scheduler and a separate MAC layer. Rather than splitting a bearer for 5G data flow, a 5G bearer 151 is managed entirely by the 5G base station 120. The base stations 110, 120 exchange messages over an Xn interface to facilitate scheduling, but the network stacks of the two base stations 110, 120 are separate. In some implementations, the communications to coordinate scheduling occur at the MAC layers of the base stations 110, 120. The base station 110 also includes a bearer 150 for 4G data flow. The schedulers for the base stations 110, 120 may set time slots in various ways, such as using a predetermined alternating schedule, or through real-time negotiations based on dynamic needs of the traffic. As an example, the base stations 110, 120 may exchange bit masks indicating the available slots that they would allow the user equipment 210 to transmit, and then adjust to avoid conflicts if any arise.

In this some implementations, the base stations 110, 120 may take advantage of the evolved packet core (EPC) technology or the 5G core (5GC) technology, which can represent elements of the core network or back haul network and servers behind the base stations. In stand-alone mode, 4G EPC does not have an SDAP layer, and so this layer may be omitted from the 4G network stack for the 4G base station 110. Similarly, if an appropriate 5GC network stack does not use an SDAP layer, this may be omitted from the 5G stack for the 5G base station 120.

As used below, a dual connectivity split can represent either of the techniques in FIGS. 1B and 1C, e.g., using a split bearer or separate bearer for the 5G data flow.

FIGS. 2-9 are diagrams that illustrate examples of different network architectures that enable concurrent use of multiple cellular network technologies. These examples show how the carrier aggregation split and dual connectivity split can be used to provide use of 4G and 5G connections concurrently, e.g., interleaved or alternating in time, even when the user equipment uses a single shared transmitter for 4G and 5G communication. Each of the examples in FIGS. 2-9 shows concurrent 4G and 5G connectivity of a particular user equipment 210 through communication with both base stations 110, 120.

In the examples shown in FIGS. 2-9, the terms "uplink" (abbreviated in the figures as simply "UL") and "downlink" (abbreviated in the figures as simply "DL") denote the relationship of the data with respect to the user equipment 210. For example, uplink data is data that the user equipment 210 transmits, and downlink data is data that the user equipment 210 receives. Further, the term "data" in the figures refers to network traffic, e.g., data packets to be provided to or received from the core network. The term "control" refers to control information, e.g., information used to manage the connections, such as requests for bandwidth, indications of allocated timeslots, acknowledgments, and so on. As a few examples, "UL data" refers to data transmitted by the user equipment 210, and "DL data" refers to data sent to the user equipment 210. Similarly, "UL control" refers to control information transmitted by the user equipment 210, and may include, for example, uplink signaling of control information related to management of uplink and/or downlink communication. "DL control" refers to control information transmitted to the user equipment 210, and may include, for example, downlink signaling of control information related to management of uplink and/or downlink communication.

Also, in the examples of FIGS. 2-9, the data and control information have labels of "4G" or "5G" indicating which network connection the data or control information corresponds to. In other words, "4G DL data and control" refers to data and control information transmitted in a downlink to the user equipment, which corresponds to a connection with the 4G base station 110. As the figures show, however, in various situations the data for one connection destination may actually be transmitted over another connection. For example, in FIG. 2, the uplink data and control information corresponding to the connection with the 5G base station 120 ("5G UL Data and Control"), is actually provided over the connection with the 4G base station 110. Thus, the indications "4G" and "5G" indicate logical correspondence to the different connection destinations, network stacks, and/or dataflows, which may be different from the physical channel, standard, or technology used to make the wireless transmission.

In some implementations, "4G DL Data" can include data communicated over the 4G physical downlink shared channel (PDSCH), and in particular user data transmitted using the downlink shared channel (DL-SCH). "4G DL Control" can include any of various types of control messages that a 4G base station 110 sends to the user equipment 210, for example, messages to indicate timing and the allocation of resources (e.g., which uplink and downlink time slots have been granted to the user equipment 210), and/or messages to instruct the user equipment 210 to increase transmission power, decrease transmission power, change wireless channels, change timing, or otherwise configure the 4G wireless connection. Control information may include messages typically transmitted on a physical control format indicator channel (PCFICH), physical downlink control channel (PDCCH), and/or physical hybrid ARQ indicator channel (PHICH). Similarly, "4G UL data" can include data communicated over the 4G physical uplink shared channel (PU-SCH). The term "4G UL control" can include messages typically transmitted over the physical uplink control channel (PUCCH).

In some implementations, "5G DL Data" can include data communicated over the 5G physical downlink shared channel (PDSCH), and in particular user data transmitted using the downlink shared channel (DL-SCH). The designation "5G DL Data" is used for this data even before it is transmitted over the 5G wireless channel, such as when the data is provided from the base station 110 to the base station 120 over the Xn interface (see FIGS. 3, 5, 7, 9). "5G DL Control" can include any of various types of control messages that a 5G base station 120 typically sends to the user equipment 210, for example, messages to indicate timing and the allocation of resources (e.g., which uplink and downlink time slots have been granted to the user equipment 210), and/or messages to instruct the user equipment 210 to increase transmission power, decrease transmission power, change wireless channels, change timing, or otherwise configure the 5G wireless connection. The control information may include messages typically transmitted on a physical control format indicator channel (PCFICH), physical downlink control channel (PDCCH), and/or physical hybrid ARQ indicator channel (PHICH). In various examples, the downlink control information represented by "5G DL Control" can originate from the 4G base station 110 and be transferred over the Xn interface to the 5G base station 120 before being transmitted to the user equipment over the 5G physical channel (see FIGS. 3, 5, 7, 9).

Similarly, "5G UL data" can include data typically communicated over the 5G physical uplink shared channel (PU-SCH). In some examples, the user equipment 210 transmits the "5G UL Data" using the 5G physical channel (see FIGS. 4 and 5). However, in other examples, this data is transmitted from the user equipment 210 to the 4G base station using the 4G protocol and 4G physical channel (see FIGS. 2, 6, and 8) before being forwarded to the 5G base station 120 over the Xn interface. Thus, the "5G DL Data" can include data that corresponds to the 5G wireless connection but is not transmitted over the 5G wireless channel. The term "5G UL control" illustrated can include information that relates to the control of the 5G wireless connection, including messages such as acknowledgments of receipt of 5G downlink data, request for allocation of resources corresponding to the 5G wireless connection, and so on. The uplink control information can include messages typically transmitted over the physical uplink control channel (PUCCH). In some examples, the 5G uplink control information is provided over the 5G wireless connection (see FIGS. 4, 5, 8, and 9). In other examples, the 5G uplink control information may be transmitted over the 4G wireless connection (see FIGS. 2, 3, 6, and 7), even though the messages relate to the 5G wireless connection.

Messages and data corresponding to the 5G connection can be processed or formatted in various ways to facilitate routing. In some implementations, uplink in time slots assigned on the 4G wireless connection for 5G data and control can be identified as corresponding to the 5G connection based on their timing. In some implementations, messages can be tagged with specific times or include a header or a control element to indicate which connection the message corresponds to. As another example, the user equipment 210 can have a different identity associated with it for its connections with the different base stations 110, 120. As a result, each wireless connection can use a different identity for communications with the user equipment, and the base stations 110, 120 can determine which connection messages correspond to based on the identity indicated.

Figure 2:
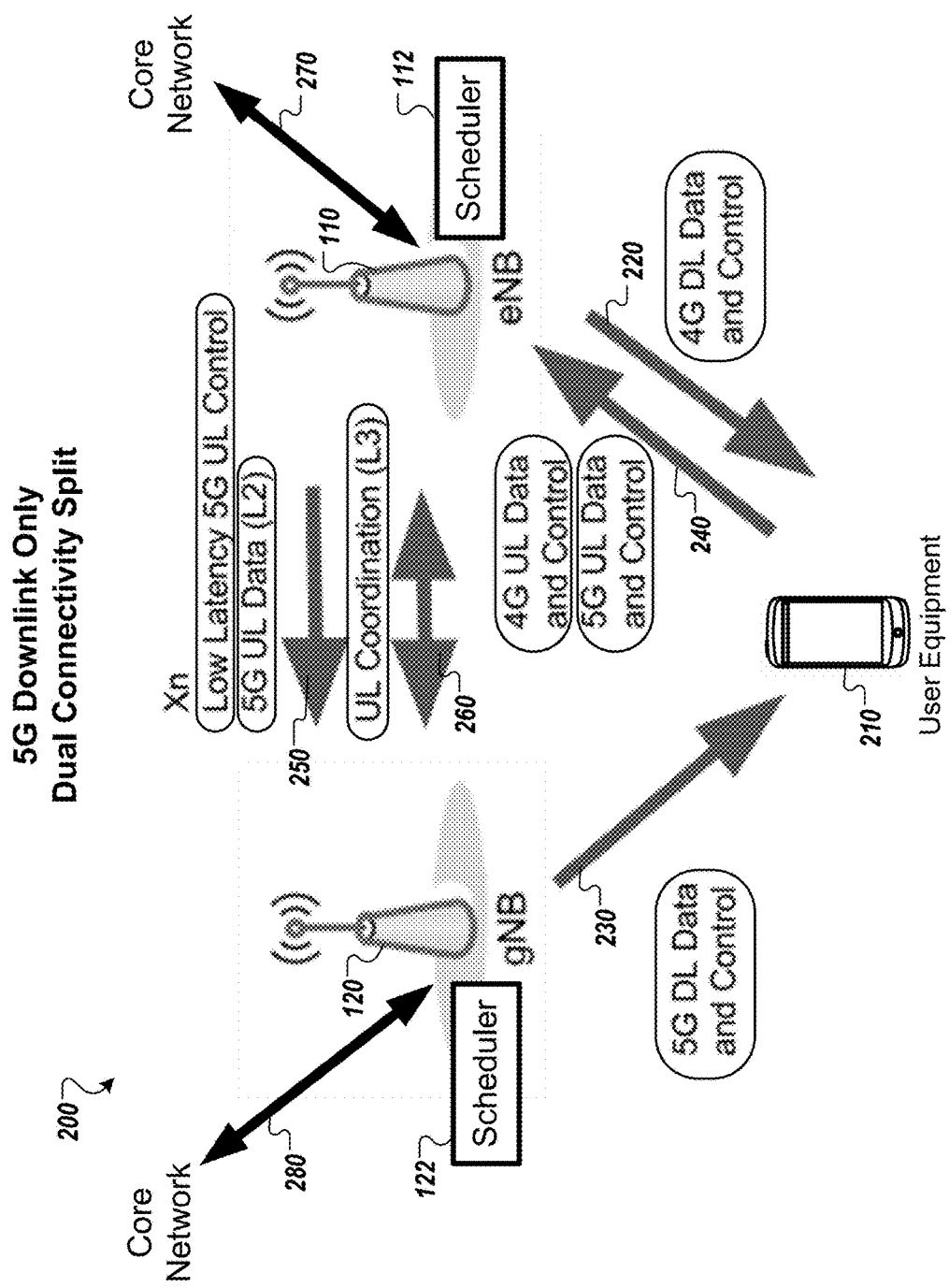
FIGS. 2-9 are diagrams that illustrate examples of different network architectures that enable concurrent use of multiple cellular network technologies.
Figure 3:
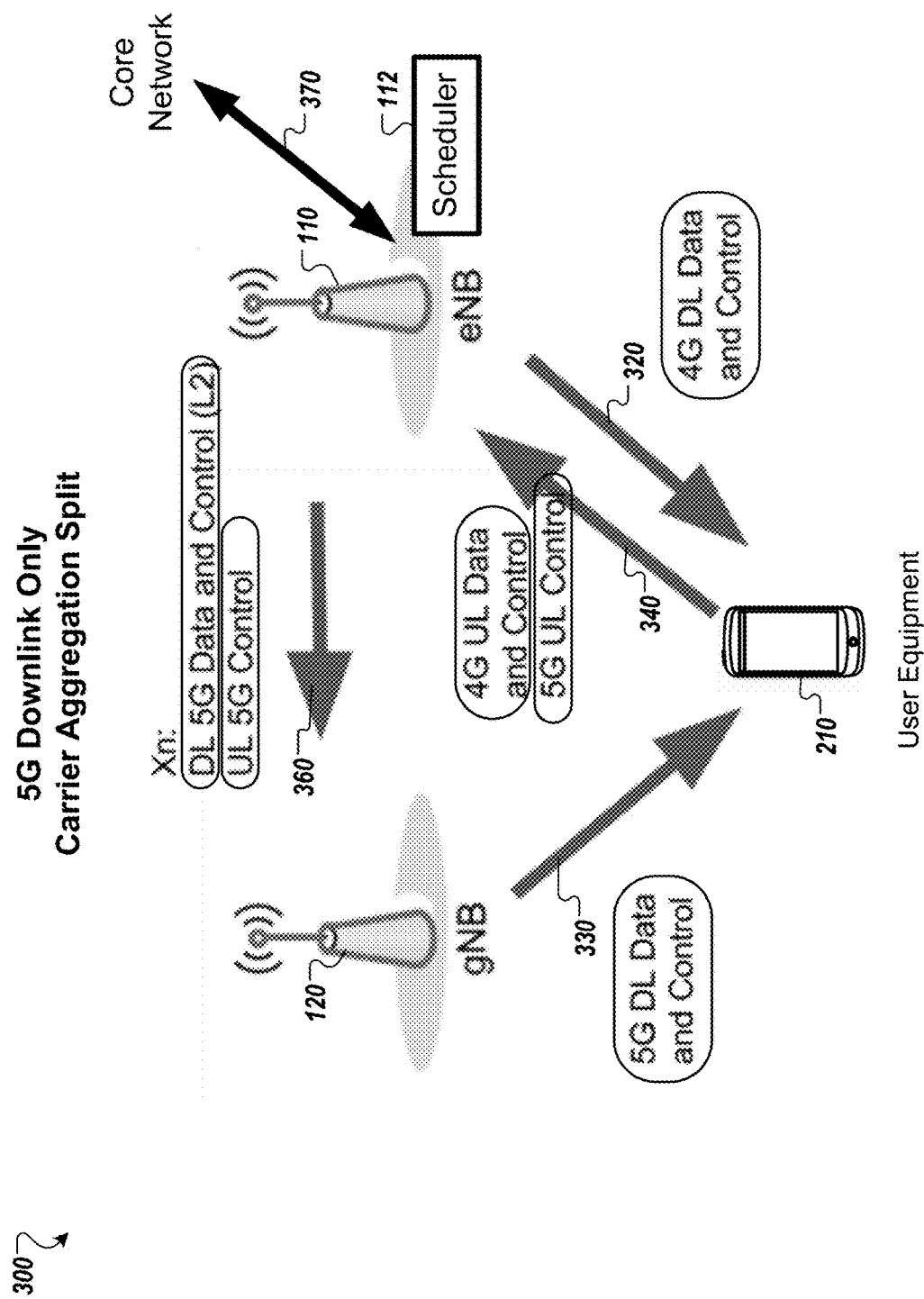
Figure 4:
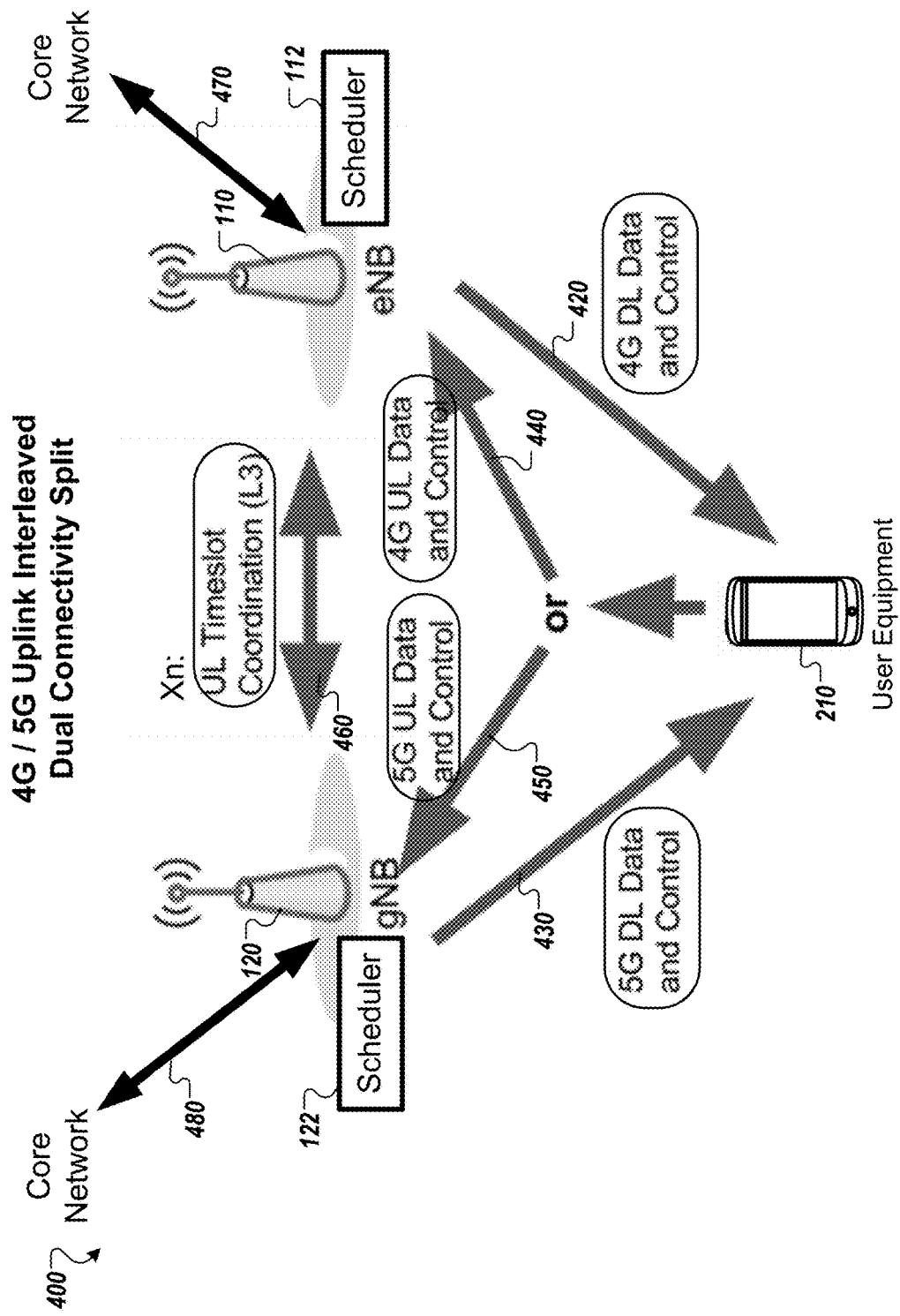

The arrangements of FIGS. 2-9 illustrate different modes of operation that two base stations 110, 120 may switch between from time to time. For example, two base stations 110, 120 may be capable of one or more of the modes shown in FIGS. 2-9 and may dynamically switch between the modes. Further, the base stations 110, 120 may concurrently operate in different modes for different user devices, depending on the capabilities of each user equipment. Thus, for one user equipment and/or at one time the base stations 110, 120 may operate as shown in FIG. 2, and for another user equipment and/or at another time the base stations 110, 120 may operate as shown in FIG. 4 or one of the other figures.

Although not illustrated in FIGS. 2-9, a user equipment capability exchange may take place before operating in the arrangement shown. The base stations 110, 120 may obtain, from the user equipment 210, data indicating capabilities of the mobile device, or a model number or other identifier that can be used to determine those capabilities from a table or other data storage. The user equipment 210 may indicate which modes it is capable of communicating in, or which modes the user equipment 210 is not capable of communicating in, in one or more messages. The mode information may be transmitted as a number, a bit mask, or in another form. With this information, the base stations 110, 120 can select one of the various modes discussed below, and send control information to establish network connections with the user equipment 210 consistent with the selected operating mode.

In general, the control information discussed below can include any of: requests for bandwidth or time slot allocation, responses to requests, contention or negotiation messages for timeslot scheduling, indications of assigned timeslots, acknowledgements (ACK) messages, no acknowledgment (NACK) messages, a channel quality indicator (CQI), an indication of buffer status, an upper layer ACK/NACK, status information for RLC and PDCP layers, power headroom report information, and so on.

FIG. 2 shows an example system 200 in which the 5G base station 120 provides only downlink service to the user equipment 210. The downlink-only 5G service is achieved using a dual connectivity split. All uplink traffic from the user equipment 210, e.g., data and control signals for both the 4G connection and 5G connection, are provided to the 4G base station 110. Thus, all uplink traffic destined for the 5G connection is sent over the 4G connection. Uplink allocation grants to the user equipment 210 could be provided on the 5G downlink and/or 4G downlink. In this example, the 4G base station 110 forwards 5G uplink data and uplink control information to the 5G base station 120.

The 4G base station 110 has a 4G scheduler 112 and the 5G base station 120 has a 5G scheduler 122. The schedulers 112, 122 may be integrated with their respective base stations 110, 120 or may be implemented with other infrastructure elements. In general, the schedulers 112, 122 each assign timeslots for uplink and downlink for the mobile devices connected to their corresponding base stations. The base stations 110, 120 communicate over the Xn interface so that the schedulers 112, 122 can negotiate or otherwise coordinate the assignment of uplink timeslots so that uplink slots are not assigned on both the 4G and 5G connections simultaneously. In the case of FIG. 2, no uplink timeslots are allocated to the user equipment 210 for the 5G connection, which may be advantageous or necessary if the user equipment 210 is unable to transmit according to 5G requirements.

Because both base stations 110, 120 have their own scheduler 112, 122 in the dual connectivity split, uplink coordination between the base stations is needed. To facilitate uplink coordination between the base stations 110, 120, the 5G base station 120 forwards uplink grant requests to the 4G base station 110. That is, for the 5G base station 120 to allocate uplink time to the user equipment 210, the 5G base station 120 sends a request over the Xn interface for the 4G base station 120 to grant the uplink time to the user equipment 210 over the 4G connection. The base station 110 also forwards all uplinked data destined for the 5G connection, which has been received over the 4G connection, over the Xn interface to the 5G base station 120 for processing.

In further detail, arrow 220 illustrates downlink signaling of 4G data and control information from the first base station 110 to the user equipment 210 over the 4G wireless connection. Arrow 230 illustrates downlink signaling of 5G data and control information from the second base station 120 to the user equipment 210 over the 5G wireless connection. Arrow 240 illustrates uplink signaling of data and control information over the 4G wireless connection, including both (i) uplink of data and control information corresponding to the 4G connection and (ii) uplink of data and control information corresponding to the 5G connection.

Arrows 250 and 260 show communication over the Xn interface between the base stations 110, 120. Arrow 250 represents transfer, from the base station 110 to the base station 120, of uplinked control information for the 5G connection that the user equipment 210 provided to the base station 110 over the 4G connection. In some implementations, this transfer may be made over a low-latency interface rather than a higher-latency interface. Arrow 250 also represents transfer, from the base station 110 to the base station 120, of uplinked data for the 5G connection that the user equipment 210 provided to the base station 110 over the 4G connection. This transfer may be made over a data link layer, e.g., layer "L2" of the OSI model.

Arrow 260 shows bidirectional communication between the base stations 110, 120 to coordinate the allocation of timeslots in the 4G connection to receive uplink of data corresponding to the 5G connection. This can include exchanging data at a network layer (e.g., "L3" in the OSI model). When the 5G scheduler 122 determines that uplink timeslots are needed for the user equipment 210, the base station 120 sends a request for allocation of uplink timeslots in the 4G connection for the user equipment 210. The base station 110 receives the request and, with the scheduler 112, the base station 110 determines one or more time slots for the uplink signaling of data for the 5G connection. This process may involve the exchange of various messages back and forth between the base stations 110, 120 to negotiate the allocation. After the base station 110 selects appropriate uplink timeslots, the base station 110 sends a message to the base station 120 indicating the uplink timeslots that have been allocated to the user equipment 210 for uplink data and/or control information. The base station 120 then indicates these timeslots to the user equipment 210 in control information provided over the 5G connection (arrow 230). After the allocation of uplink timeslots in the 4G connection for transfer of 5G data and/or control information, the base station 110 will receive uplink data in those timeslots (as part of arrow 240) and will forward information received during those timeslots to the base station 120 (arrow 250).

The base station 110 has a connection to the core network, shown with arrow 270. The base station 110 provides uplink data for the 4G connection to the core network, and obtains from the core network downlink data for the 4G connection to provide to the user equipment 210 over the 4G connection. At least in some implementations, the base station 120 also has a connection to the core network, shown with arrow 280. The base station 120 provides uplink data for the 5G connection (which was previously forwarded to the base station 120 from the base station 110) to the core network. The base station 120 also obtains from the core network downlink data for the 5G connection to provide to the user equipment 210 over the 5G connection (arrow 230). In the case of separate bearers (FIG. 1C), the connection to the core network shown by arrow 280 may be separate and independent from the connection represented by arrow 270. Nevertheless, in other cases, such as the use of a split bearer (FIG. 1B), the transmission of uplink data to the core network, and sometimes also receipt of downlink data from the core network, may occur through or be dependent on the base station 110, because the network stack for the 5G connection may be split between the base stations 110, 120.

FIG. 3 shows an example system 300 in which the 5G base station 120 provides only downlink service to the user equipment 210. Unlike FIG. 2, the arrangement of FIG. 3 uses a carrier aggregation split. As a result, there is only one scheduler, and all uplink traffic arrives at the base station 110 with the scheduler that assigned the uplink allocation. The 4G base station 110 acts as the master and provides one-way instructions to the 5G base station 120 to dictate the timing and content of downlink transmissions. The 4G base station 110 forwards 5G downlink data to be transmitted, as well as control information, to the 5G base station 120. No coordination between the base stations 110, 120 is required because the 5G base station 120 simply carries out the instructions of the 4G base station 110.

The base station 110 has a scheduler 112, which may be integrated with the base station 110 or may be implemented with other infrastructure elements. In general, the scheduler 112 assigns timeslots for uplink and downlink signaling for the various user equipment connected with the base stations 110, 120. In the case of FIG. 3, all uplink signaling for the user equipment 210 occurs over the 4G connection; the 5G connection is configured for downlink service only.

The base station 110 has a connection to the core network, shown with arrow 370. The base station 110 provides uplink data for the 4G connection to the core network, and obtains from the core network downlink data for the 4G connection to provide to the user equipment 210 over the 4G connection. The base station 120 does not have a connection to a core network. As a result, the base station 120 obtains downlink data to be provided to the user equipment over the 5G wireless connection from the base station 110 over the Xn interface.

In further detail, arrow 320 illustrates downlink signaling of 4G data and control information from the first base station 110 to the user equipment 210 over the 4G wireless connection. Arrow 330 illustrates downlink signaling of 5G data and control information from the second base station 120 to the user equipment 210 over the 5G wireless connection.

Arrow 340 illustrates uplink signaling of data and control information over the 4G wireless connection, including both (i) uplink of data and control information corresponding to the 4G connection and (ii) uplink of control information corresponding to the 5G connection. In this example, no uplink data corresponds to the 5G connection. Instead, all uplink timeslot allocations are initiated by the scheduler 112 for the 4G connection and are handled by the base station 110 (e.g., processed and sent on to the core network).

Arrow 360 shows communication over the Xn interface between the base stations 110, 120. Arrow 360 represents the transfer, to the base station 120, of downlink data, which the base station 110 obtained from the core network, to be provided over the 5G connection (arrow 330). Because the base station 120 does not have a connection to a core network, downlink data is obtained first by the base station 110 and forwarded to the base station 120 for transmission to the user equipment 210. The arrow 360 also represents the transfer, from the base station 110 to the base station 120, of downlink control information to be provided to the user equipment 210. The arrow 360 further represents the forwarding, to the base station 120 by the base station 110, of uplinked control information for the 5G connection (arrow 330) provided by the user equipment 210 over the 4G connection (arrow 340). In some implementations, the communication represented by arrow 360 occurs over a data link layer, e.g., "L2" of the OSI model.

In the example of FIG. 3, there is no coordination between the base stations 110, 120 for uplink planning. The scheduler 112 determines which uplink time slots to assign to the user equipment 210 and informs the user equipment 210 (e.g., arrow 320). The 5G base station 120 acts as directed by the 4G base station 110, by transmitting the downlink data and control information that the base station 110 provides in the downlink time slots that the base station 110 specifies.

FIG. 4 shows an example system 400 in which 4G uplink and 5G uplink service are interleaved, and a dual connectivity split is used. In this arrangement, the user equipment 210 can signal uplink and downlink with both base stations 110, 120 through their respective connections. Both 4G and 5G uplink signaling from the user equipment 210 are allowed, but not at the same time because the user equipment 210 only uses a single radio for both cellular connections. The base stations 110, 120 each have a separate scheduler running, and each obtains data from the core network separately.

With only a single cellular transmitter at the user equipment 210, the base stations 110, 120 need to coordinate the time slots assigned for the uplink medium at any given time. Uplink timeslot coordination occurs as the 4G base station 110 and 5G base station 120 negotiate which uplink timeslots to use. Data and control for 4G and 5G are sent over their respective technologies, directly to the appropriate base station.

The 4G base station 110 has a 4G scheduler 112 and the 5G base station 120 has a 5G scheduler 122. The schedulers 112, 122 are similar to those described with reference to FIG. 2. In the case of FIG. 4, uplink timeslots can be allocated to the user equipment 210 on the 5G connection for uplink signaling of data and control information corresponding to the 5G connection, and uplink timeslots can also be allocated to the user equipment 210 on the 4G connection for uplink signaling of data and control information corresponding to the 5G connection.

In further detail, arrow 420 illustrates downlink signaling of 4G data and control information from the first base station 110 to the user equipment 210 over the 4G wireless connection. Arrow 430 illustrates downlink signaling of 5G data and control information from the second base station 120 to the user equipment 210 over the 5G wireless connection. Arrow 440 illustrates uplink signaling, over the 4G connection, of data and control information corresponding to the 4G connection. Arrow 450 represents uplink signaling, over the 5G connection, of data and control information corresponding to the 5G connection.

In FIG. 4, the indication that uplink from the user equipment 210 may take place on arrow 440 or 450 shows that any given transmission will be directed to one base station 110, 120 or the other. Each base station 110, 120, with its associated scheduler 112, 122, allocates different uplink time slots. In the time slots allocated by the scheduler 112 for the 4G connection, the UE 210 sends uplink data and control over the 4G connection (arrow 440) to the base station 110. In time slots allocated by the scheduler 122 for the 5G connection, the UE 210 sends uplink data and control over the 5G connection (arrow 450) to the base station 120. Because each of the connections to the user equipment 210 support both uplink and downlink of data and control information, there is no need to forward uplinked data or control information from the user equipment between the base stations 110, 120. Nevertheless, the base stations 110, 120 still need to coordinate the allocation of their uplink timeslots for the user equipment 210 to avoid conflicts.

Arrow 460 shows bidirectional communication between the base stations 110, 120 to coordinate the allocation of timeslots for 4G and 5G connections. This can include exchanging data at a network layer (e.g., "L3" in the OSI model). The example of FIG. 4 shows a model in which the base stations 110, 120 cooperate to avoid uplink allocation conflicts. When one of the schedulers 112, 122 attempts to schedule uplink timeslots, it can notify the other scheduler 112, 122 and attempt to reserve the use of a timeslot. The schedulers 112, 122, through communication between the base stations 110, 120, can use a negotiation or contention process if there is a potential conflict. After either of the schedulers 112, 122 allocates uplink timeslots, the allocation is indicated in control information for the corresponding connection (e.g., arrow 420 for the 4G connection or arrow 430 for the 5G connection).

The base station 110 has a connection to the core network, shown with arrow 470. The base station 110 provides uplink data for the 4G connection to the core network, and obtains from the core network downlink data for the 4G connection to provide to the user equipment 210 over the 4G connection (arrow 420). At least in some implementations, the base station 120 also has a connection to the core network, shown with arrow 480. The base station 120 provides uplink data for the 5G connection to the core network. The base station 120 also obtains from the core network downlink data for the 5G connection to provide to the user equipment 210 over the 5G connection (arrow 430). In the case of separate bearers (FIG. 1C), the connection to the core network shown by arrow 480 may be separate and independent from the connection represented by arrow 470. Nevertheless, in other cases, such as the use of a split bearer (FIG. 1B), the transmission of uplink data to the core network, and sometimes also receipt of downlink data from the core network, may be occur through or depend on the base station 110, as the network stack for the 5G connection may be split between the base stations 110, 120.

Figure 5:
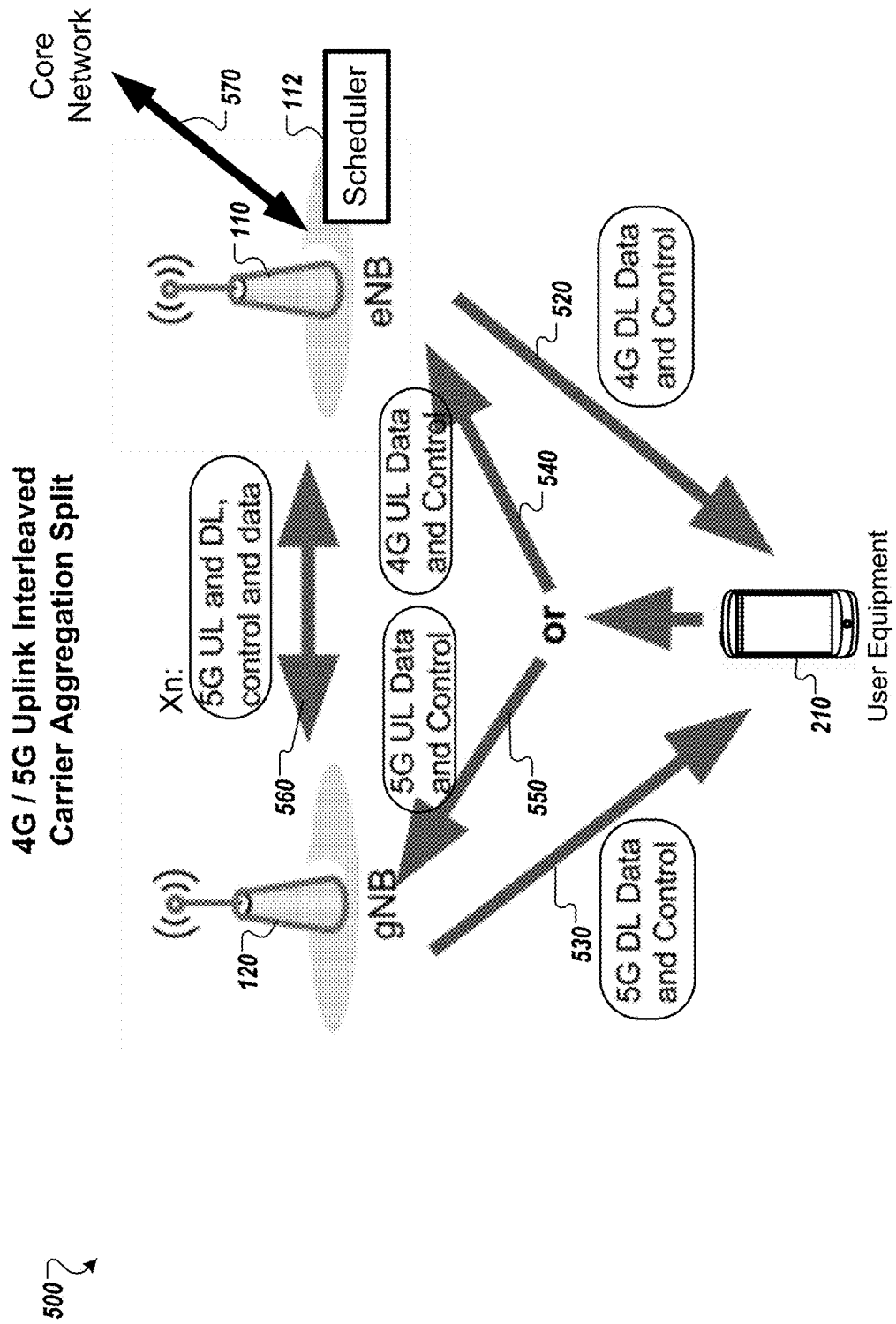

FIG. 5 shows an example system 500 in which 4G uplink and 5G uplink service are interleaved, and a carrier aggregation split is used. There is only one scheduler 112, at the 4G base station 110. The 4G base station 110 makes all the decisions regarding transmissions and routes all traffic. In this arrangement, wireless 5G downlink traffic originates at the 4G base station 110. For example, the 4G base station 110 sends, over the Xn interface, (i) downlink data to be transmitted by the 5G base station 120, (ii) control information for downlink transmissions by the 5G base station 120, and (iii) control information for uplink communication to the 5G base station 120. The 4G base station 110 sets when the 4G connection is allowed uplink timeslots, and when the 5G connection with the base station 120 is allowed uplink timeslots. Because the 5G base station 120 does not have a scheduler, the 5G base station 120 sends received uplink data from the user equipment 210 to the 4G base station 110 for processing.

The base station 110 has a scheduler 112 similar to that described with reference to FIG. 3. In the case of FIG. 5, uplink signaling occurs using both the 4G and 5G connections. The base station 110, with the single scheduler 112, assigns timeslots for both of these connections.

The base station 110 has a connection to the core network, shown with arrow 570. The base station 110 provides uplink data for the 4G connection to the core network, and obtains from the core network downlink data for the 4G connection to provide to the user equipment 210 over the 4G connection. The base station 120 does not have a connection to a core network. As a result, the base station 120 obtains downlink data to be provided over the 5G connection from the base station 110 over the Xn interface. The base station 120 also provides data and control information received over the 5G uplink connection to the base station 110, so the base station 110 can process the control information and assign appropriate time slots, as well as pass uplinked data to the core network.

In further detail, arrow 520 illustrates downlink signaling of 4G data and control information from the first base station 110 to the user equipment 210 over the 4G wireless connection. Arrow 530 illustrates downlink signaling of 5G data and control information from the second base station 120 to the user equipment 210 over the 5G wireless connection.

Arrow 540 illustrates uplink signaling, over the 4G wireless connection, of data and control information corresponding to the 4G connection from the user equipment 210 to the base station 110. Arrow 550 illustrates uplink signaling, over the 5G wireless connection, of data and control information corresponding to the 5G connection from the user equipment 210 to the base station 120.

Arrow 560 shows communication over the Xn interface between the base stations 110, 120. In particular, arrow 560 represents two types of transfers involving data and control information for the 5G connection. First, the base station 120 forwards the data and control information that it received over the 5G uplink connection (arrow 550) to the base station 110. Without a scheduler and connection to a core network, the base station 120 relies on the base station 110 to provide uplinked data to the core network and to take the 4G and 5G uplink control information into account when scheduling timeslots for the 5G downlink connection (arrow 530). Second, the base station 110 transfers to the base station 120 downlink data and control information for the base station 120 to provide over the 5G connection (arrow 530). Because the base station 120 does not have a connection to a core network, downlink data is obtained first by the base station 110 and forwarded on to the base station 120 for transmission to the user equipment 210. Similarly, without a scheduler, the base station 120 relies on the scheduler 112 of the base station 110 to assign timeslots for the 5G connection (arrow 530). Also represented by arrow 560 is the transfer of information from the 4G base station 110 indicating the time slots for the base station 120 to send the downlink data over the 5G connection. In other words, arrow 560 carries the instructions of which data to send and when to send it over the 5G connection.

The 5G base station 120 acts as directed by the 4G base station 110, by transmitting the downlink data and control information that the 4G base station 110 provides, in the downlink time slots that the 4G base station 110 specifies.

Figure 6:
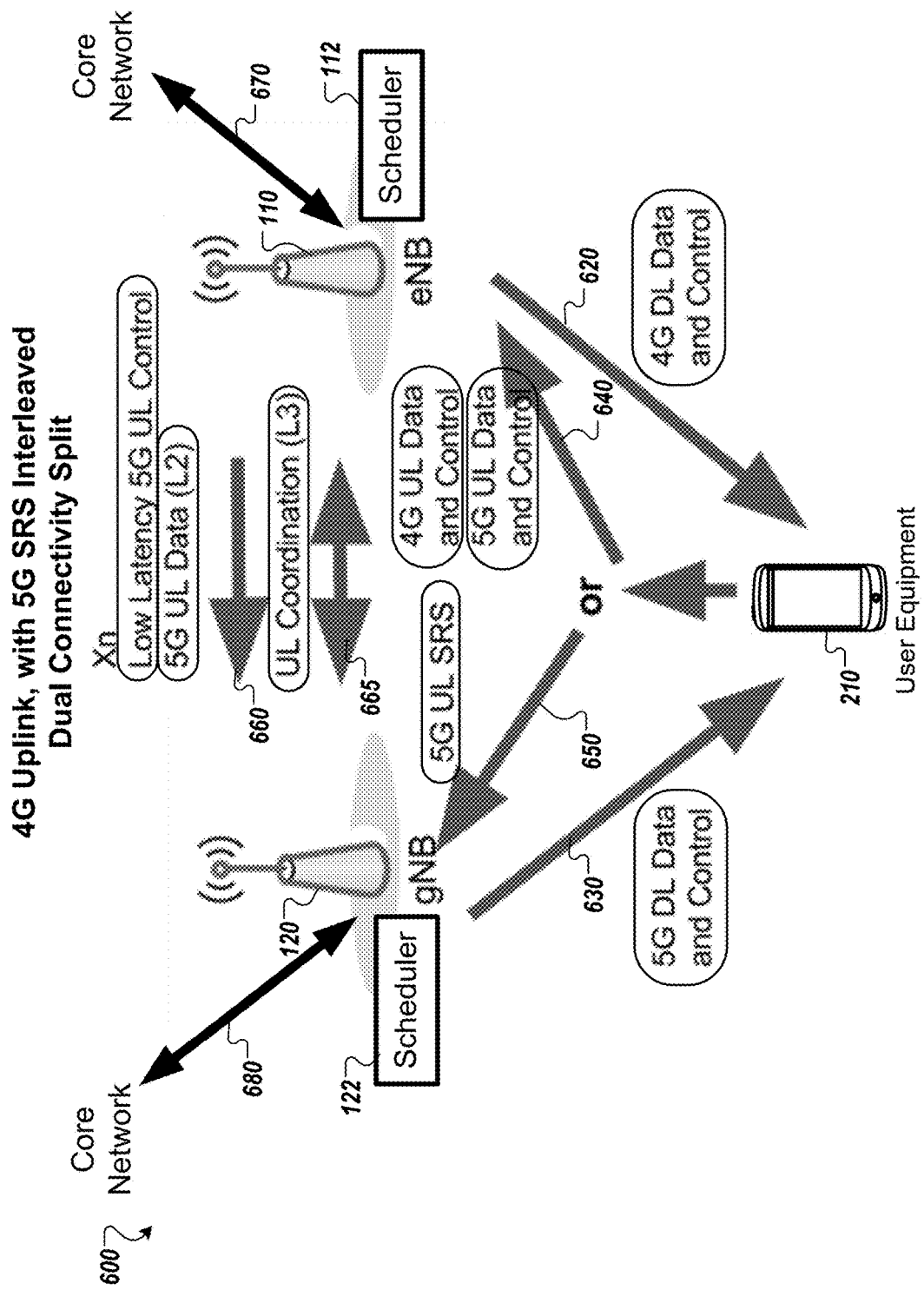

FIG. 6 shows an example system 600 in which 4G uplink is interleaved with 5G sounding reference signal (SRS)

uplink, using a dual connectivity split. By contrast with FIGS. 4 and 5, this example uses the uplink over the 5G connection for the limited purpose of allowing the user equipment 210 to send information indicating 5G wireless channel characteristics. This information is used by the 5G base station 120 only, and so it is efficient to transmit that information directly to the 5G base station 120, which can use the information for rapid and adaptive beamforming. In this sense, the arrangement is similar to the one shown in FIG. 2 (showing 5G downlink only), with the exception that a time period is allocated for direct uplink of the SRS information to the 5G base station 120 over the 5G connection. Because the 4G base station 110 does not need the 5G SRS information, the 4G base station 110 only needs to know the timeslot in which the 5G SRS upload will occur, to avoid contention. The base stations 110, 120 can negotiate the appropriate time for this information to be uploaded and direct the user equipment 210 to send the SRS at the appropriate time.

The 4G base station 110 has a 4G scheduler 112 and the 5G base station 120 has a 5G scheduler 122. The schedulers 112, 122 are similar to those described with reference to FIG. 2. In the case of FIG. 6, uplink signaling over the 5G connection is limited to sending sounding reference signals, which the 5G base station 120 can use to estimate channel quality. The schedulers 112, 122 can schedule other uplink time slots for the user equipment 210 to avoid conflicting with the sounding reference signal transmission. Because data and control information are not transmitted by the user equipment 210 over the 5G connection, the schedulers 112, 122 communicate to allocate uplink timeslots on the 4G connection to transmit data and control information corresponding to the 4G connection and the 5G connection.

In further detail, arrow 620 illustrates downlink signaling of 4G data and control information from the first base station 110 to the user equipment 210 over the 4G wireless connection. Arrow 630 illustrates downlink signaling of 5G data and control information from the second base station 120 to the user equipment 210 over the 5G wireless connection. Arrow 640 illustrates uplink signaling of data and control information over the 4G wireless connection, including both (i) uplink of data and control information corresponding to the 4G connection and (ii) uplink of data and control information corresponding to the 5G connection. Arrow 650 represents transmission of the sounding reference signal, which can be sent over the 5G connection (e.g., using the power, frequency, timing, or other characteristics of the 5G technology used).

Arrows 660 and 665 show communication over the Xn interface between the base stations 110, 120. Arrow 660 represents transfer, from the base station 110 to the base station 120, of uplinked control information for the 5G connection that the user equipment 210 provided to the base station 110 over the 4G connection (e.g., in the transfer shown as arrow 640). The forwarding of this control information may be made over a low-latency interface rather than a higher-latency interface. Arrow 660 also represents the transfer, from the base station 110 to the base station 120, of uplinked data for the 5G connection that the user equipment 210 provided to the base station 110 over the 4G connection (e.g., in the transfer shown as arrow 640). This data transfer may be made over a data link layer, e.g., layer "L2" of the OSI model.

Arrow 665 shows bidirectional communication between the base stations 110, 120 to coordinate the allocation of timeslots in the 4G connection to receive uplink signaling of data and control information corresponding to the 5G connection. This coordination can include exchanging data at a network layer (e.g., "L3" in the OSI model). When the 5G scheduler 122 determines that uplink timeslots are needed for the user equipment 210, the 5G base station 120 sends a request to the 4G base station 110 for allocation of uplink timeslots in the 4G connection for the user equipment 210. The base station 110 receives the request and, with the scheduler 112, the base station 110 determines one or more time slots for the uplink signaling of data for the 5G connection. This process may involve the exchange of various messages back and forth between the base stations 110, 120 to negotiate the allocation. After the base stations select appropriate uplink timeslots, the 4G base station 110 sends a message (arrow 665) to the 5G base station 120 indicating the uplink timeslots that have been allocated for the user equipment 210 for uplink data and/or control information. The base station 120 then indicates these timeslots to the user equipment 210 in control information provided over the 5G connection (arrow 630). After the allocation of uplink timeslots in the 4G connection for transfer of 5G data and/or control information, the base station 110 will receive uplink data in those timeslots (as part of arrow 640) and will forward data and/or control information received during those timeslots to the base station 120 (arrow 660).

The base station 110 has a connection to the core network, shown with arrow 670. The base station 110 provides uplink data for the 4G connection to the core network, and obtains from the core network downlink data for the 4G connection to provide to the user equipment 210 over the 4G connection. At least in some implementations, the base station 120 also has a connection to a core network, shown with arrow 680. The base station 120 provides uplink data for the 5G connection (which was previously forwarded to the base station 120 from the base station 110) to the core network. The base station 120 also obtains, from the core network downlink, data to provide to the user equipment 210 over the 5G connection. In the case of separate bearers (FIG. 1C), the connection to the core network shown by arrow 680 may be separate and independent from the connection represented by arrow 670. Nevertheless, in other cases, such as the use of a split bearer (FIG. 1B), the transmission of uplink data to the core network, and sometimes also receipt of downlink data from the core network, may be occur through or depend on the base station 110, because the network stack for the 5G connection may be split between the base stations 110, 120.

Figure 7:
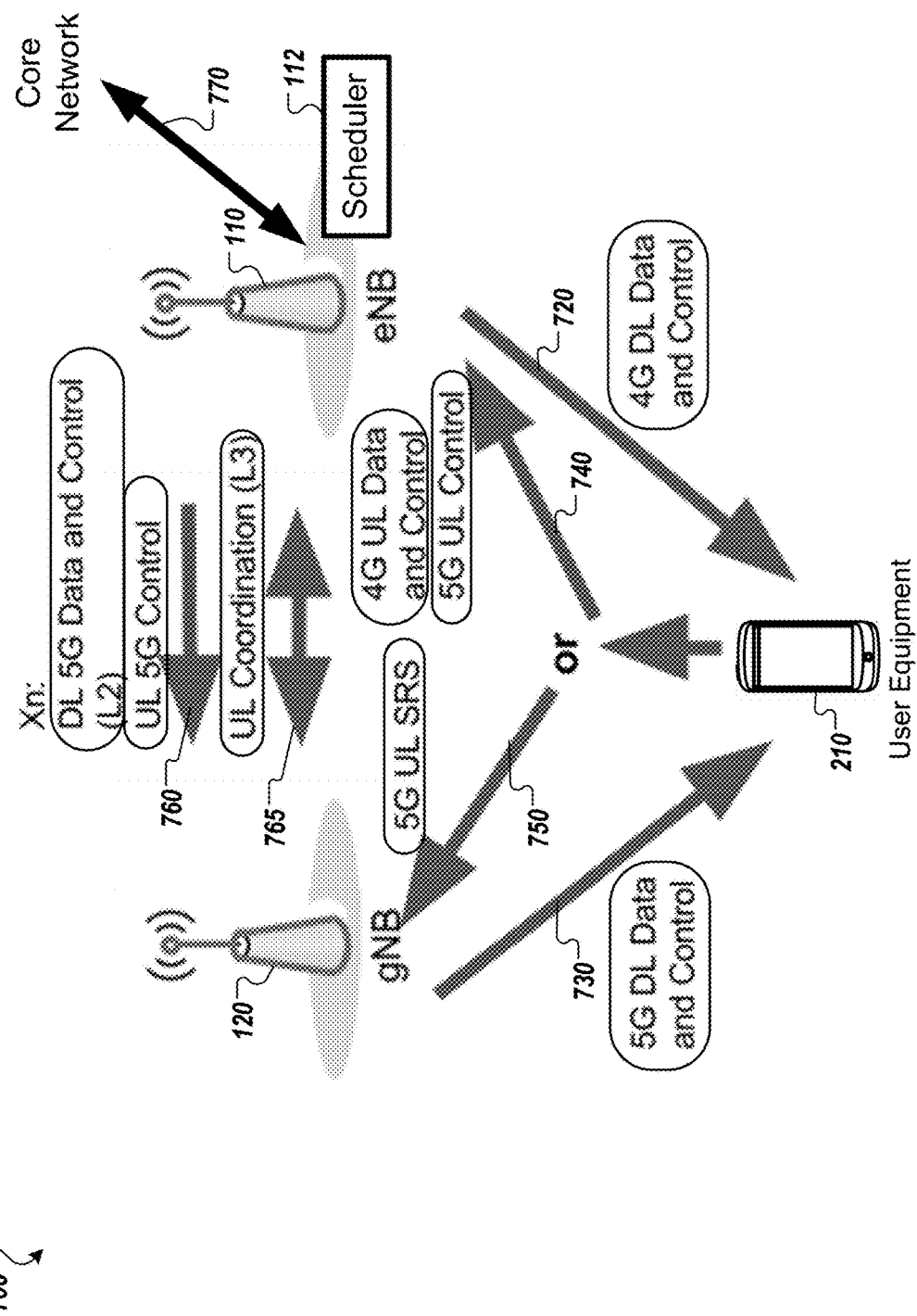

FIG. 7 shows an example system 700 in which 4G uplink is interleaved with 5G sounding reference signal (SRS) uplink, using a carrier aggregation split. This is similar to the 5G downlink-only example of FIG. 3, but it adds the capability for direct 5G SRS uplink. All uplink data traffic and uplink control messages for the 5G connection are sent over the 4G connection with the 4G base station 110, except for the 5G SRS information. Thus, the arrangement uses the 5G connection for downlink only, except for the uplink signaling of 5G SRS information directly to the 5G base station 120 over the 5G connection. All other data and control uplinks, for both the 4G and 5G connections, are made using the 4G interface. In some implementations, because the carrier aggregation split uses only one scheduler, the 4G base station 110 dictates the timing of the timeslots for 5G uplink to the user equipment 210 and to the 5G base station 120. No negotiation between the base stations 110, 120 may be required. In other implementations, the base stations 110, 120 may negotiate which uplink timeslots to use for 5G SRS information.

The base station 110 has a scheduler 112 similar to that described with reference to FIG. 3. In the case of FIG. 7, uplink signaling of data and control information from the user equipment 210 occurs only over the 4G connection. The 5G uplink connection is used for the limited purpose of sending a sounding reference signal (SRS). The base station 110, with the single scheduler 112, assigns timeslots for both of the 4G and 5G connections.

The base station 110 has a connection to the core network, shown with arrow 770. The base station 110 provides uplink data for the 4G connection to the core network, and obtains from the core network downlink data for the 4G connection to provide to the user equipment 210 over the 4G connection.

The base station 120 does not have a connection to a core network. As a result, the base station 120 obtains downlink data to be provided over the 5G connection from the base station 110 over the Xn interface.

In further detail, arrow 720 illustrates downlink signaling of 4G data and control information from the first base station 110 to the user equipment 210 over the 4G wireless connection. Arrow 730 illustrates downlink signaling of 5G data and control information from the second base station 120 to the user equipment 210 over the 5G wireless connection. Arrow 740 illustrates uplink signaling, over the 4G wireless connection, of data and control information corresponding to the 4G connection from the user equipment 210 to the base station 110. Arrow 740 also represents the uplink signaling of control information for the 5G connection being transferred over the 4G connection. Arrow 750 illustrates transmission of a 5G SRS by the user equipment 210.

Arrow 760 shows communication over the Xn interface between the base stations 110, 120. In particular, arrow 760 represents two types of transfers involving data and control information for the 5G connection. First, the base station 110 forwards the uplinked 5G control information that it received over the 4G connection (arrow 740) to the base station 120. Without a scheduler and connection to the core network, the base station 120 relies on the base station 110 to provide uplinked data to the core network and to take the 4G and 5G uplink and SRS control information into account when scheduling timeslots for the 5G downlink connection (arrow 730). Second, the base station 110 transfers to the base station 120 downlink data and control information for the base station 120 to provide over the 5G connection. Because the base station 120 does not have a connection to a core network, downlink data is obtained first by the base station 110 and forwarded to the base station 120 for transmission to the user equipment 210. Similarly, without a scheduler, the base station 120 relies on the scheduler 112 of the base station 110 to assign timeslots for the 5G connection (arrow 730). Also represented by arrow 760 is the transfer of information indicating the time slots for the base station 120 to send the downlink data over the 5G connection (arrow 730).

As with the examples of FIGS. 3 and 5, in the example of FIG. 7, the base station 120 acts as directed by the base station 110, by transmitting the downlink data and control information that the base station 110 provides, in the downlink time slots that the base station 110 specifies. Thus, the arrow 760 can represent predominantly or entirely unidirectional communication from the base station 110 to the base station 120.

In the example of FIG. 7, the sending of the SRS for the 5G connection presents the possibility of coinciding with and conflicting with an uplink timeslot for the 4G connection. In some implementations, the scheduler 112 simply schedules both the 5G SRS transmission and the 4G uplink slot assignments so that the transmission times do not overlap. This information can be provided over the Xn interface, as shown by arrow 765. In some implementations, the base stations 110, 120 may negotiate for the timing of the SRS and uplink time slots.

Figure 8:
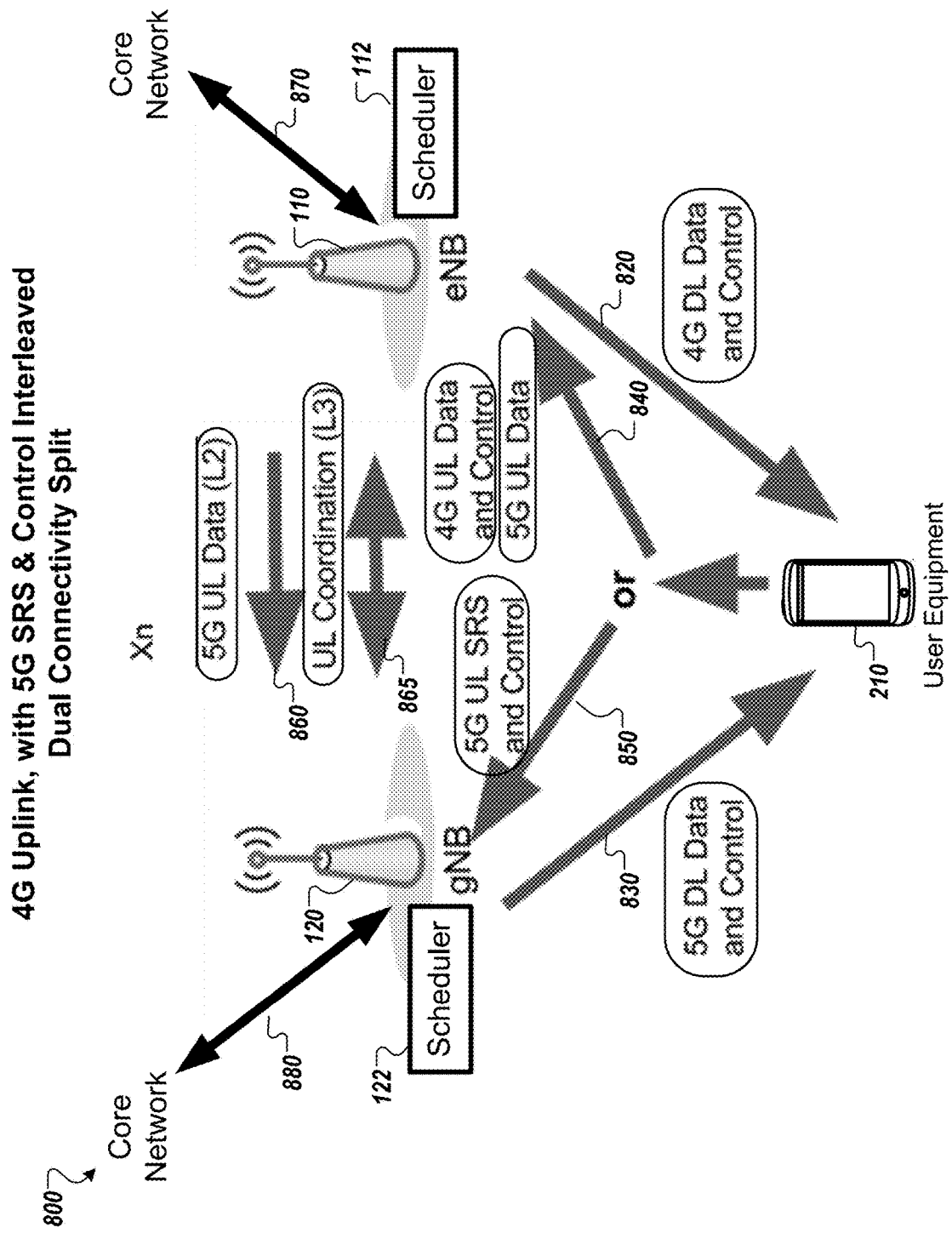

FIG. 8 shows an example system 800 in which 4G uplink is interleaved with 5G uplink of 5G SRS information and 5G control information, using a dual connectivity split. This example is similar to the 5G downlink-only arrangement of FIG. 2, but with negotiated 5G uplink timeslots allocated for uplink signaling of 5G SRS and 5G control information over the 5G connection. Uplink data traffic from the user equipment 210 for the 5G connection is still sent over the 4G connection to the 4G base station 110, which forwards the data to 5G base station 120. The 5G uplink is used only for sending 5G SRS information and 5G control information. Examples of control information that may be sent over the 5G uplink include an acknowledgement (ACK), a negative-acknowledgement (NACK), a channel quality indicator (CQI), a buffer status indicator, an upper layer ACK or NACK such as for an RLC layer or PDCP layer, and a power headroom report. To perform uplink coordination, the 5G base station 120 forwards uplink grant requests to the 4G base station 110. The base stations 110, 120 negotiate which uplink timeslots to use for 5G SRS and 5G control information.

The 4G base station 110 has a 4G scheduler 112 and the 5G base station 120 has a 5G scheduler 122. The schedulers 112, 122 are similar to those described with reference to FIG. 2. In the case of FIG. 8, uplink signaling over the 5G connection is limited to sending sounding reference signals and sending control information. The schedulers 112, 122 can schedule other uplink time slots for the user equipment 210 to avoid conflicting with the sounding reference signal output and control information uplink. Because data and is not uplinked by the user equipment 210 over the 5G connection, the schedulers 112, 122 communicate to allocate uplink timeslots on the 4G connection to transmit data corresponding to the 4G connection and the 5G connection.

In further detail, arrow 820 illustrates downlink signaling of 4G data and control information from the first base station 110 to the user equipment 210 over the 4G wireless connection. Arrow 830 illustrates downlink signaling of 5G data and control information from the second base station 120 to the user equipment 210 over the 5G wireless connection. Arrow 840 illustrates uplink signaling of data and control information over the 4G wireless connection, including both (i) uplink signaling of data and control information corresponding to the 4G connection and (ii) uplink signaling of data corresponding to the 5G connection. Arrow 850 represents transmission of the sounding reference signal and control information for the 5G connection (e.g., a request for allocation of uplink and/or downlink slots), which can be transmitted over the 5G connection.

In FIG. 8, the indication that uplink signaling from the user equipment 210 may take place on arrow 840 or 850 shows that any given transmission will be directed to one base station 110, 120 or the other. Each base station 110, 120, with its associated scheduler 112, 122, allocates different uplink time slots. In the time slots allocated by the scheduler 112 for the 4G connection, the UE 210 sends data and control information, for the 4G connection, over the 4G connection to the base station 110. Some time slots allocated on the 4G connection are designated for data corresponding to the 5G connection, which will be received by the 4G base station 110 before being forwarded to the 5G base station 120. The scheduler 122 also allocates some time slots for the uplink signaling of control information for the 5G connection, to be sent over the 5G connection (arrow 850).

Arrows 860 and 865 show communication over the Xn interface between the base stations 110, 120. Arrow 860 represents the transfer, to the base station 120, of uplinked data for the 5G connection that the user equipment 210 provided to the base station 110 over the 4G connection (e.g., in the transfer shown as arrow 840). This data may be transferred over a data link layer, e.g., layer "L2" of the OSI model.

Arrow 865 shows bidirectional communication between the base stations 110, 120 to coordinate the allocation of timeslots in the 4G connection to receive uplink of data corresponding to the 5G connection. This coordination can include exchanging data at a network layer (e.g., "L3" in the OSI model). When the scheduler 122 determines that uplink timeslots for the 5G connection are needed for the user equipment 210, the base station 120 sends a request for allocation of uplink timeslots in the 4G connection for the user equipment 210. The base station 110 receives the request, and with the scheduler 112 the base station 110 determines one or more time slots for the uplink of data for the 5G connection. This process may involve the exchange of various messages back and forth between the base stations 110, 120 to negotiate the allocation. After the base stations select appropriate uplink timeslots, the base station 110 sends a message (arrow 865) to the base station 120 indicating the uplink timeslots that have been allocated for the user equipment 210 to transmit data for the 5G connection over the 4G connection. The base station 120 then indicates these timeslots to the user equipment 210 in control information provided over the 5G connection (arrow 830). After the allocation of uplink timeslots in the 4G connection for transfer of 5G data, the base station 110 will receive uplink data in those timeslots (as part of arrow 840) and will forward data received during those timeslots to the base station 120 (arrow 860).

The base station 110 has a connection to the core network, shown with arrow 870. The base station 110 provides uplink data for the 4G connection to the core network, and obtains from the core network downlink data for the 4G connection to provide to the user equipment 210 over the 4G connection (arrow 820). At least in some implementations, the base station 120 also has a connection to a core network, shown with arrow 880. The base station 120 provides uplink data for the 5G connection (which was previously forwarded to the base station 120 from the base station 110) to the core network. The base station 120 also obtains from the core network downlink data for the 5G connection to provide to the user equipment 210 over the 5G connection (arrow 830). In the case of separate bearers (FIG. 1C), the connection to the core network shown by arrow 880 may be separate and independent from the connection represented by arrow 870. Nevertheless, in other cases, such as the use of a split bearer (FIG. 1B), the transmission of uplink data to the core network, and sometimes also receipt of downlink data from the core network, may occur through or depend on the base station 110, because the network stack for the 5G connection may be split between the base stations 110, 120.

Figure 9:
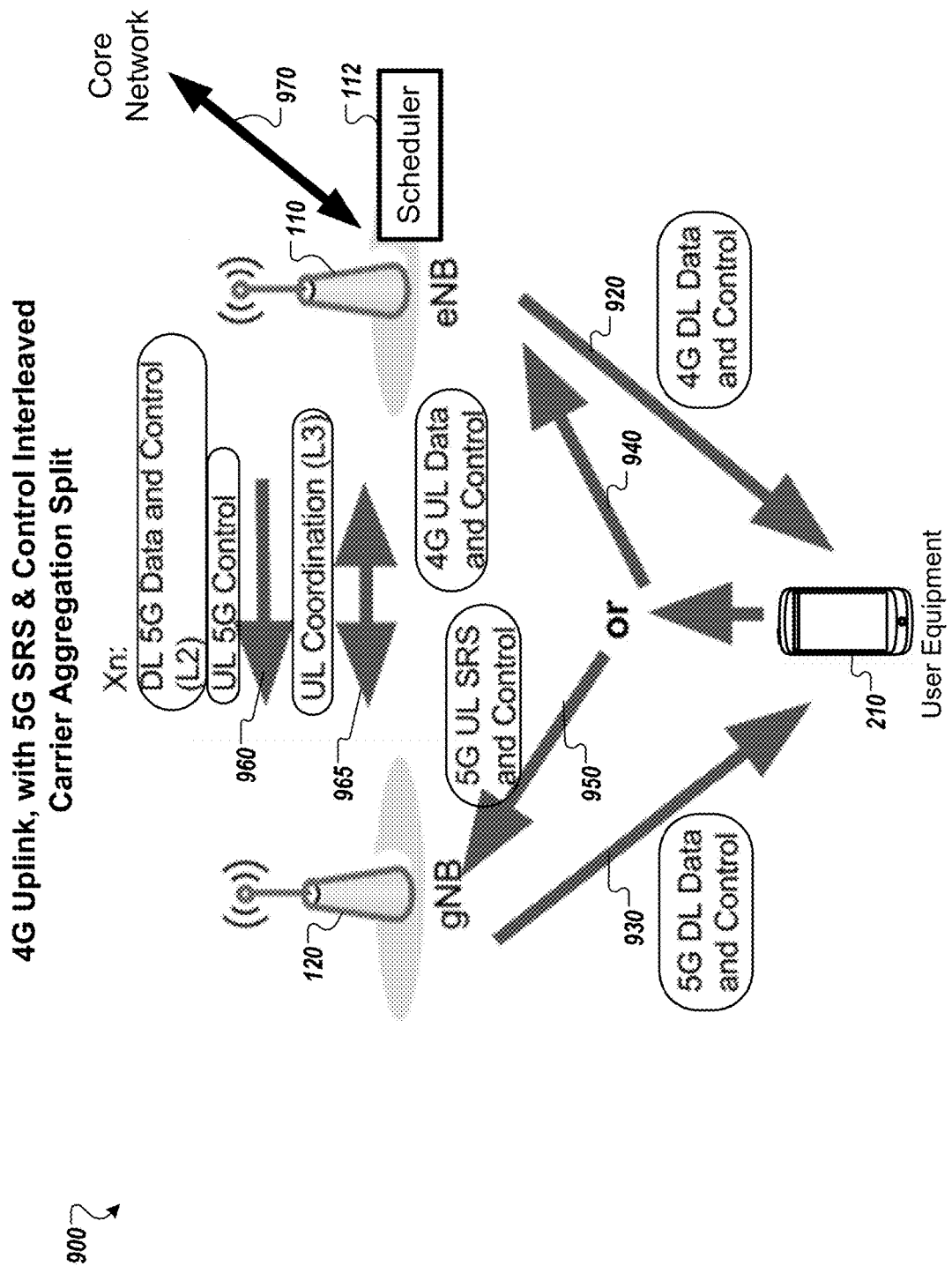

FIG. 9 shows an example system 900 in which 4G uplink is interleaved with 5G uplink of SRS information and control information, using a carrier aggregation split. This is similar to the 5G downlink-only example of FIG. 3, but it adds the capability for direct 5G uplink signaling of the SRS information and 5G control information. All uplink data traffic for the 5G connection are sent over the 4G connection with the 4G base station 110. In some implementations, because the carrier aggregation split uses only one scheduler, the 4G base station 110 dictates the timing of the timeslots for 5G uplink signaling to the user equipment 210 and to the 5G base station 120. No negotiation between the base stations 110, 120 may be required. In other implementations, the base stations 110, 120 may negotiate which uplink timeslots to use for 5G SRS and control.

The base station 110 has a scheduler 112 similar to that described with reference to FIG. 3. In the case of FIG. 9, uplink signaling over the 5G connection is limited to sending sounding reference signals and sending control information. The 5G uplink connection (arrow 950) is used for the limited purposes of sending a sounding reference signal (SRS) and sending control information. The base station 110, with the single scheduler 112, assigns timeslots for both of the 4G and 5G connections.

In further detail, arrow 920 illustrates downlink of 4G data and control information from the first base station 110 to the user equipment 210 over the 4G wireless connection. Arrow 930 illustrates downlink of 5G data and control information from the second base station 120 to the user equipment 210 over the 5G wireless connection. Arrow 940 illustrates uplink, over the 4G wireless connection, of data and control information corresponding to the 4G connection from the user equipment 210 to the base station 110. Arrow 950 illustrates transmission of a 5G SRS by the user equipment 210 and transmission of 5G uplink control information.

Arrow 960 shows communication over the Xn interface between the base stations 110, 120. In particular, arrow 960 represents two types of transfers involving data and control information for the 5G connection. First, the base station 110 sends uplink control information for the 5G uplink connection (arrow 950) to the base station 120. Without a scheduler and connection to a core network, the base station 120 relies on the base station 110 to take the 4G and 5G uplink control information into account when scheduling timeslots for the 5G uplink and downlink connections (arrow 950 and 930). Second, the base station 110 transfers to the base station 120 downlink data and control information for the base station 120 to provide over the 5G connection (930). Because the base station 120 does not have a connection to the core network, downlink data is obtained first by the base station 110 and forwarded on to the base station 120 for transmission to the user equipment 210. Similarly, without a scheduler, the base station 120 relies on the scheduler 112 of the base station 110 to assign timeslots for the 5G downlink connection (arrow 930).

The base station 110 has a connection to the core network, shown with arrow 970. The base station 110 provides uplink data for the 4G connection to the core network, and obtains from the core network downlink data for the 4G connection to provide to the user equipment 210 over the 4G connection (arrow 920). The base station 120 does not have a connection to a core network. As a result, the base station 120 obtains downlink data to be provided over the 5G connection (arrow 930) from the base station 110 over the Xn interface (arrow 960).

As with the examples of FIGS. 3, 5, and 7, in the example of FIG. 9, the base station 120 acts as directed by the base station 110, by transmitting the downlink data and control information that the base station 110 provides, in the downlink time slots that the base station 110 specifies. Thus the arrow 960 can represent predominantly or entirely unidirectional communication from the base station 110 to the base station 120.

To avoid conflicts, the scheduler 112 schedules the 5G SRS transmission and the 5G control information time slots and the 4G uplink slot assignments so that the transmission times do not overlap. The timing for the SRS signal and the uplink information for the 5G connection can be provided over the Xn interface, as shown by arrow 965. In some implementations, the base stations 110, 120 may negotiate for the timing of the SRS and uplink time slots. The communication corresponding to arrow 965 can take place over a network layer, e.g., an "L3" layer of the OSI model.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

The techniques described herein can be represented according to the various aspects described below. Embodiments of the invention may be described as supported by the following statements:

Aspect 1: a system comprising: a first wireless base station configured to support a first wireless connection providing uplink and downlink data transfer to a user device; a second wireless base station configured to support a second wireless connection providing at least downlink data transfer to the user device; a communication interface between the first wireless base station and the second wireless base station; and a first scheduler, coupled to the first wireless base station, configured to schedule uplink timeslots such that the user device can use a single radio to concurrently communicate with the first wireless base station using the first wireless connection and with the second wireless base station using the second wireless connection.

Aspect 2: the system of aspect 1, wherein the first wireless base station and the second wireless base station are configured to support concurrent connections of the user device to the first wireless base station and the second wireless base station using carrier aggregation.

Aspect 3: the system of aspect 1 or 2, wherein: the first wireless base station is configured to provide downlink data and downlink control information to the user device over the first wireless connection; the second wireless base station is configured to provide downlink data and downlink control information to the user device over the second wireless connection; the first scheduler is configured to interleave timeslots for the downlink of data and control information for the first wireless connection with timeslots for the downlink of data and control information for the second wireless connection.

Aspect 4: the system of any of aspects 1-3, wherein the first scheduler is configured to schedule uplink and downlink timeslots for both the first wireless base station and the second wireless base station; and wherein the second wireless base station transmits downlink data and downlink control information to the user device during the downlink timeslots assigned by the first scheduler.

Aspect 5: the system of any of aspects 1-4, wherein the first wireless base station is connected to a first core network and the second wireless base station is not connected to a core network; wherein the first wireless base station is configured to (i) obtain, from the first core network, downlink data to be transmitted to the user device, (ii) provide a first portion of the obtained downlink data to the second wireless base station, and (iii) provide downlink control information specifying time slots for the second wireless base station to transmit the first portion of the downlink data over the second wireless connection; and wherein the second wireless base station is configured to (i) receive the first portion of the downlink data from the first wireless base station, and (ii) transmit the received first portion of the downlink data and downlink control information to the user device over the second wireless connection during the downlink time slots assigned by the first scheduler.

Aspect 6: the system of any of aspects 1-5, wherein the communication interface includes a control plane interface.

Aspect 7: the system of any of aspects 1-6, wherein the first wireless base station is configured to provide downlink data and downlink control information for the second wireless connection to the second wireless base station using a data link layer of the communication interface.

Aspect 8: the system of any of aspects 1-7, wherein the first wireless base station is configured to: receive, from the user device, uplink control information for the second wireless connection over the first wireless connection; and forward the uplink control information for the second wireless connection, which was received over the first wireless connection, to the second wireless base station.

Aspect 9: the system of any of aspects 1-8, wherein the first wireless base station and the user device exchange uplink signaling of data and control information and downlink signaling of data and control information over the first wireless connection; wherein the first wireless base station is configured to receive requests for allocations of second wireless connection downlink bandwidth from the user device during uplink time slots of the first wireless connection; and wherein the first wireless base station, the second wireless base station, and the user device communicate such that the user device does not transmit uplink data or control information over the second wireless connection.

Aspect 10: the system of aspect 11, wherein the communication interface provides one-way communication, from the first wireless base station to the second wireless base station, of: uplink control information for the second wireless connection, downlink data for the second wireless connection, and downlink control information for the second wireless connection.

Aspect 11: the system of any of aspects 1-7, wherein: the first wireless base station is configured to receive, from the user device, uplink signaling of data and control information for the first wireless connection over the first wireless connection; and the second wireless base station is configured to receive, from the user device, uplink signaling of data and control information for the second wireless connection over the second wireless connection.

Aspect 12: the system of any of aspects 1-7 and 11, wherein the second wireless base station is configured to: receive, from the user device, uplink signaling of data and control information corresponding to the second wireless connection over the second wireless connection; and provide the received data and control information corresponding to the second wireless connection to the first wireless base station; and wherein the first wireless base station is configured to provide the received data corresponding to the second wireless connection to a core network.

Aspect 13: the system of any of aspects 1-7, 11, and 12, wherein the first scheduler is configured to assign, based on the received control information corresponding to the second wireless connection and uplinked control information corresponding to the first wireless connection: first timeslots for the first wireless base station to receive uplink data over the first wireless connection; and second timeslots for the second wireless base station to receive uplink data over the second wireless connection.

Aspect 14: the system of any of aspects 1-7 and 11-13, wherein the first wireless base station is configured to: provide, to the second wireless base station, downlink data that the first wireless base station obtained from the core network and that corresponds to the second wireless connection; and provide, to the second wireless base station, an indication of the second timeslots for the second wireless base station to receive uplink data over the second wireless connection.

Aspect 15: the system of any of aspects 1-8, 13, and 14, wherein the first scheduler is configured to interleave uplink timeslots to support transmission of first uplink data by the user device to the first wireless base station and transmission of second uplink data by the user device to the second wireless base station, such that uplink timeslots for the second wireless connection and first wireless connection do not overlap.

Aspect 16: the system of any of aspects 1-8 and 11-15, wherein: the second wireless base station is configured to receive a sounding reference signal from the user device over the second wireless connection, in time slots interleaved with uplink timeslots for sending uplink data and uplink control information to the first wireless base station over the first wireless connection; wherein the second wireless base station is configured to not receive uplink data from the user device over the second wireless connection; and the first wireless base station is configured to receive uplink data from the user device for the second wireless connection over the first wireless connection and provide the uplink data to a core network.

Aspect 17: the system of aspect 16, wherein: the second wireless base station is configured to receive a sounding reference signal from the user device over the second wireless connection; and wherein the second wireless base station is configured to (i) not receive uplink data from the user device over the second wireless connection, and (ii) not receive uplink control information from the user device over the second wireless connection.

Aspect 18: the system of aspect 16, wherein: the second wireless base station is configured to (i) receive a sounding reference signal from the user device over the second wireless connection and (ii) receive control information from the user device over the second wireless connection; and the second wireless base station is configured to not receive uplink data from the user device over the second wireless connection.

Aspect 19: the system of any of aspects 1-8 and 11-18, wherein the first wireless base station and the second wireless base station are configured to exchange information over multiple layers of the communication interface; wherein the first wireless base station and the second wireless base station are configured to coordinate uplink timeslots for the first wireless connection and second wireless connection through communication over a network layer of the communication interface; and wherein the first wireless base station is configured to provide downlink data for transmission to the user device over the second wireless connection and control information for the second wireless connection using a data link layer of the communication interface.

Aspect 20: the system of aspect 1, wherein the first wireless base station and the second wireless base station are configured to support concurrent connections with the user device using a dual connectivity split in which downlink traffic is provided to the user device from a core network using the first wireless connection and using the second wireless connection.

Aspect 21: the system of aspect 1 or 20, wherein: the first wireless base station is configured to provide downlink data and downlink control information to the user device over the first wireless connection; and the second wireless base station is configured to provide downlink data and downlink control information to the user device over the second wireless connection; the downlink data and downlink control information for the first wireless connection being interleaved with the downlink data and downlink control information for the first second connection during the concurrent communication with the user device.

Aspect 22: the system of any of aspects 1, 20, and 21, further comprising: a first connection coupling the first wireless base station to a first core network; a second scheduler, coupled to the second wireless base station; a second connection coupling the second wireless base station to a second core network; and wherein the first wireless base station and second wireless base station are configured to use the communication interface to coordinate time slots for communication with the user device.

Aspect 23: the system of aspect 22, wherein, to coordinate the time slots for communication with the user device, the first wireless base station and the second wireless base station are configured to exchange information over a network layer of the communication interface.

Aspect 24: the system of aspect 22 or 23, wherein, to coordinate the time slots for communication with the user device, the first wireless base station and the second wireless base station are configured to exchange information over a control plane of the communication interface between the first wireless base station and the second wireless base station.

Aspect 25: the system of any of aspects 22-24, wherein the second wireless connection provides only downlink data and control to the user device; wherein the first wireless base station is configured to (i) receive uplink of data and control information corresponding to the second wireless connection over the first wireless connection, and (ii) provide the received uplink data and control information corresponding to the second wireless connection to the second wireless base station; and wherein the second wireless base station is configured to send a request to the first wireless base station to grant uplink time for the user device to provide uplink data or uplink control information corresponding to the second wireless connection using the first wireless connection.

Aspect 26: the system of any of aspects 22-24, wherein each of the first wireless connection and the second wireless connection provides (i) uplink signaling of data and control information from the user device and (ii) downlink signaling of data and control information to the user device.

Aspect 27: the system of any of aspects 22-24, wherein each of the first wireless connection and the second wireless connection provides downlink signaling of data and control information to the user device; wherein the first wireless base station is configured to receive, over the first wireless connection, (i) uplink signaling of data and control information corresponding to the first wireless connection, and (ii) uplink signaling of data and control information corresponding to the second wireless connection; wherein the first wireless base station is configured to provide, to the second wireless base station, the received uplinked data and control information corresponding to the second wireless connection; and wherein the second wireless base station is configured to receive uplink signaling of sounding reference signal information from the user device over the second wireless connection.

Aspect 28: the system of any of aspects 22-24, wherein each of the first wireless connection and the second wireless connection provides downlink signaling of data and control information to the user device; wherein the first wireless base station is configured to receive, over the first wireless connection, (i) uplink signaling of data and control information corresponding to the first wireless connection, and (ii) uplink signaling of data corresponding to the second wireless connection; wherein the first wireless base station is configured to provide, to the second wireless base station, the received uplinked data corresponding to the second wireless connection; and wherein the second wireless base station is configured to receive uplink signaling of sounding reference signal information and control information from the user device over the second wireless connection.

Aspect 29: the system of any of aspects 20-28, wherein the first wireless base station and the second wireless base station provide dual connectivity using a split bearer, in which a network stack for data transfer for the second wireless connection is split between the first wireless base station and the second wireless base station.

Aspect 30: the system of aspect 29, wherein the split bearer is connected to a first media access control (MAC) layer of the first wireless base station and a second MAC layer of the second wireless base station.

Aspect 31: the system of any of aspects 1 and 20-28, wherein the first wireless base station and the second wireless base station provide dual connectivity using separate bearers.

Aspect 32: the system of any of aspects 1 and 20-31, wherein: the first wireless base station and the second wireless base station are configured to coordinate uplink timeslots for the first wireless connection and the second wireless connection through a network layer of the communication interface; and the first wireless base station is configured to provide downlink data for transmission to the user device over the second wireless connection and control information for the second wireless connection through a data link layer of the communication interface.

Aspect 33: the system of any of aspects 1-9, 20-25, and 29-32, wherein the first and second wireless base stations are configured to (i) provide only downlink data transfer over the second wireless connection, and (ii) provide uplink data transfer corresponding to the second wireless connection only over the first wireless connection.

Aspect 34: the system of any of aspects 1, 20-25 and 27-33, wherein the first base station is configured to forward uplink data from the user device to the second wireless base station.

Aspect 35: the system of any of aspects 1-10 and 13-34, wherein the first wireless base station and second wireless base station are configured to negotiate an allocation of uplink timeslots for the first wireless network connection and the second wireless network connection such that the user device can transfer data in the uplink timeslots and maintain the concurrent first and second wireless network connections.

Aspect 36: the system of any of aspects 1-35, wherein the first wireless base station is configured to provide the first wireless connection using a first wireless communication protocol; and wherein the second wireless base station is configured to provide the second wireless connection using a second wireless communication protocol that is different from the first wireless communication protocol.

Aspect 37: the system of any of aspects 1-36, wherein the first wireless connection uses a less-advanced communication technology, and wherein the second wireless connection uses a more-advanced communication technology.

Aspect 38: the system of any of aspects 1-37, wherein the second wireless connection provides a higher data rate for transmitting data to the user device than the first wireless connection, or the second wireless connection provides a more efficient use of the physical channel for transmitting data to the user device.

Aspect 39: one or more machine-readable media storing instructions that, when executed by one or more processors, cause a base station to perform the operations that the first base station and/or first scheduler are configured to perform in the system of any of aspects 1-38.

Aspect 40: one or more machine-readable media storing instructions that, when executed by one or more processors, cause a base station to perform the operations that the second base station and/or second scheduler are configured to perform in the system of any of aspects 1-38.

Aspect 41: a base station configured to operate in the manner described for the first base station in the system of any of aspects 1-38.

Aspect 42: the base station of aspect 41, comprising a first scheduler, with the first scheduler configured to operate in the manner described for the first scheduler of the system of any of aspects 1-38 or to coordinate uplink timeslots as described for the first base station in the system of any of aspects 20-38.

Aspect 43: a base station configured to operate in the manner described for the second base station of the system of any of aspects 1-38.

Aspect 44: the base station of aspect 43, comprising a second scheduler, with the second scheduler configured to operate in the manner described for the second scheduler of the system of any of aspects 22-24 or to coordinate uplink timeslots as described for the second base station for the system of any of aspects 20-38.

Aspect 45: a method comprising the actions that the first base station is configured to perform in the system of any of aspects 1-38.

Aspect 46: the method of aspect 45, comprising the actions that the first scheduler is configured to perform in the system of for any of aspects 1-38.

Aspect 47: a method comprising actions that the second base station is configured to perform in the system of any of aspects 1-38.

Aspect 48: the method of aspect 47, comprising actions that the second scheduler is configured to perform in the system of any of aspects 22-24.

Aspect 49: a method comprising the actions that elements of the system of any of aspects 1-38 are configured to perform.

Aspect 50: a user device configured to operate as described in any of aspects 1-38.

Aspect 51: a method comprising the actions of the user device described in any of aspects 1-38.

Aspect 51: one or more machine-readable media storing instructions that, when executed by one or more processors, cause the performance of actions of the user device as described in any of aspects 1-38.

What is claimed is:
1. A system comprising:
a first wireless base station configured to support a first wireless connection using a first network access tech- nology, the first wireless connection including an uplink connection for providing an uplink data transfer from a user device and a first downlink connection for providing a first downlink data transfer to the user device;

a second wireless base station configured to support a second wireless connection using a second network access technology that is different from the first network access technology, the second wireless connection maintained concurrently with the first wireless connection, the second wireless connection including a second downlink connection for providing a second downlink data transfer to the user device;

a communication interface between the first wireless base station and the second wireless base station; and a first scheduler, coupled to the first wireless base station, configured to schedule uplink timeslots such that the user device can use a single radio to communicate the uplink data transfer concurrently with at least the first downlink data transfer or the second downlink data transfer, the uplink data transfer to the first wireless base station including uplink data for the second wireless base station.

2. The system of claim 1, wherein the first wireless base station and the second wireless base station are configured to support concurrent connections of the user device to the first wireless base station and the second wireless base station using dual connectivity.

3. The system of claim 1, wherein:
the first wireless base station is configured to provide downlink data and downlink control information to the user device over the first wireless connection;
the second wireless base station is configured to provide downlink data and downlink control information to the user device over the second wireless connection; and
the first scheduler is configured to interleave timeslots of the downlink data and downlink control information for the first wireless connection with timeslots of the downlink data and downlink control information for the second wireless connection.

4. The system of claim 1, wherein the first scheduler is configured to schedule uplink and downlink timeslots for both the first wireless base station and the second wireless base station; and
wherein the second wireless base station transmits downlink data and downlink control information to the user device during the downlink timeslots assigned by the first scheduler.

5. The system of claim 4, wherein the first wireless base station is connected to a first core network and the second wireless base station is not connected to a core network;
wherein the first wireless base station is configured to (i) obtain, from the first core network, downlink data to be transmitted to the user device, (ii) provide a first portion of the obtained downlink data to the second wireless base station, and (iii) provide downlink control information specifying time slots for the second wireless base station to transmit the first portion of the downlink data over the second wireless connection; and
wherein the second wireless base station is configured to (i) receive the first portion of the downlink data from the first wireless base station, and (ii) transmit the received first portion of the downlink data and downlink control information to the user device over the second wireless connection during the downlink time slots assigned by the first scheduler.

6. The system of claim 1, wherein the communication interface includes a control plane interface.

7. The system of claim 1, wherein the first wireless base station is configured to provide downlink data and downlink control information for the second wireless connection to the second wireless base station using a data link layer of the communication interface.

8. The system of claim 1, wherein the first wireless base station is configured to:
receive, from the user device, uplink control information for the second wireless connection over the first wireless connection; and
forward the uplink control information for the second wireless connection, which was received over the first wireless connection, to the second wireless base station.

9. The system of claim 1, wherein:
the first wireless base station is configured to receive, from the user device, uplink signaling of data and control information for the first wireless connection over the first wireless connection;
the second wireless connection includes a second uplink connection; and
the second wireless base station is configured to receive, from the user device, uplink signaling of control information for the second wireless connection over the second uplink connection.

10. The system of claim 1, wherein:
the second wireless base station is configured to receive a sounding reference signal from the user device over the second wireless connection, in uplink time slots interleaved with uplink timeslots for sending uplink data and uplink control information to the first wireless base station over the first wireless connection;
the second wireless base station is configured to not receive uplink data from the user device over the second wireless connection; and
the first wireless base station is configured to receive uplink data from the user device for the second wireless connection over the first wireless connection and provide the uplink data to a core network.

11. The system of claim 10, wherein:
the second wireless base station is configured to receive a sounding reference signal from the user device over the second wireless connection; and
the second wireless base station is configured to (i) not receive uplink data from the user device over the second wireless connection, and (ii) not receive uplink control information from the user device over the second wireless connection.

12. The system of claim 10, wherein:
the second wireless base station is configured to (i) receive a sounding reference signal from the user device over the second wireless connection and (ii) receive control information from the user device over the second wireless connection; and
the second wireless base station is configured to not receive uplink data from the user device over the second wireless connection.

13. The system of claim 1, wherein the first wireless base station and the second wireless base station are configured to exchange information over multiple protocol layers of the communication interface;
wherein the first wireless base station and the second wireless base station are configured to coordinate uplink timeslots for the first wireless connection and second wireless connection through communication over a network protocol layer of the communication interface; and wherein the first wireless base station is configured to provide downlink data for transmission to the user device over the second wireless connection and control information for the second wireless connection using a data link protocol layer of the communication interface.

14. The system of claim 1, wherein the first wireless base station and the second wireless base station are configured to support concurrent connections with the user device using a dual connectivity split in which downlink traffic is provided to the user device from a core network using the first wireless connection and using the second wireless connection.

15. The system of claim 14, wherein the first wireless base station and the second wireless base station provide dual connectivity using a split bearer, in which a network stack for data transfer for the second wireless connection is split between the first wireless base station and the second wireless base station.

16. The system of claim 15, wherein the split bearer is connected to a first media access control (MAC) layer of the first wireless base station and a second MAC layer of the second wireless base station.

17. The system of claim 14, wherein the first wireless base station and the second wireless base station provide dual connectivity using separate bearers.

18. The system of claim 14, wherein the first base station is configured to forward uplink data from the user device to the second wireless base station.

19. The system of claim 1, wherein:
the first wireless base station is configured to provide downlink data and downlink control information to the user device over the first wireless connection; and
the second wireless base station is configured to provide downlink data and downlink control information to the user device over the second wireless connection, the downlink data and downlink control information for the first wireless connection being interleaved with the downlink data and downlink control information for the second connection during a concurrent communication with the user device.

20. The system of claim 1, further comprising:
a first connection, coupling the first wireless base station to a first core network;
a second scheduler, coupled to the second wireless base station;
a second connection, coupling the second wireless base station to a second core network; and
wherein the first wireless base station and second wireless base station are configured to use the communication interface to coordinate time slots for communication with the user device.

21. The system of claim 20, wherein the second wireless connection provides only downlink data and control to the user device;
wherein the first wireless base station is configured to (i) receive uplink of data and control information corresponding to the second wireless connection over the first wireless connection, and (ii) provide the received uplink data and control information corresponding to the second wireless connection to the second wireless base station; and
wherein the second wireless base station is configured to send a request to the first wireless base station to grant uplink time for the user device to provide uplink data or uplink control information corresponding to the second wireless connection using the first wireless connection.

22. The system of claim 20, wherein each of the first wireless connection and the second wireless connection provides downlink signaling of data and control information to the user device;
wherein the first wireless base station is configured to receive, over the first wireless connection, (i) uplink signaling of data and control information corresponding to the first wireless connection, and (ii) uplink signaling of data corresponding to the second wireless base station;
wherein the first wireless base station is configured to provide, to the second wireless base station, the received uplinked data corresponding to the second wireless base station; and
wherein the second wireless base station is configured to receive uplink signaling of sounding reference signal information and control information from the user device over the second wireless connection.

23. The system of claim 1, wherein the first wireless base station and the second wireless base station are configured to (i) provide only downlink data transfer over the second wireless connection, and (ii) provide uplink data transfer corresponding to the second wireless base station only over the first wireless connection.

24. One or more non-transitory machine-readable media storing instructions that, responsive to execution by one or more processors, direct a first wireless base station to perform operations comprising:
supporting a first wireless connection using a first network access technology, the first wireless connection including an uplink connection for providing an uplink data transfer from a user device and a first downlink connection for providing a first downlink data transfer to the user device; and
scheduling, using a first scheduler coupled to the first wireless base station and a communication interface between the first wireless base station and a second wireless base station that uses a second network access technology that is different from the first network access technology, uplink timeslots such that the user device can use a single radio to communicate the uplink data transfer concurrently with at least the first downlink data transfer or a second downlink data transfer provided by a second downlink connection with the second base station by using the uplink connection with the first wireless base station to include uplink data for the second wireless base station, the second downlink connection provided by the second base station using a second network access technology that is different from the first network access technology.

25. A first wireless base station comprising:
a communication interface between the first wireless base station and a second wireless base station;
one or more processors; and
one or more machine-readable media storing instructions that, responsive to execution by the one or more processors, direct the first wireless base station to perform operations comprising:
supporting a first wireless connection using a first network access technology, the first wireless connection including an uplink connection for providing an uplink data transfer from a user device and a first downlink connection for providing a first downlink data transfer to the user device; and scheduling, using a first scheduler coupled to the first wireless base station and the communication interface, uplink timeslots such that the user device can use a single radio to communicate the uplink data transfer concurrently with at least the first downlink data transfer or a second downlink data transfer provided by a second downlink connection with a second base station that uses a second network access technology that is different from the first network access technology by using the uplink connection with the first wireless base station to include uplink data for the second wireless base station.

26. A method performed by a first wireless base station, the method comprising:

supporting a first wireless connection using a first network access technology, the first wireless connection including an uplink connection for providing an uplink data transfer from a user device and a first downlink connection for providing a first downlink data transfer to the user device; and scheduling, using a first scheduler coupled to the first wireless base station and a communication interface between the first wireless base station and a second wireless base station that uses a second network access technology that is different from the first network access technology, uplink timeslots such that the user device can use a single radio to communicate the uplink data transfer concurrently with at least the first downlink data transfer or a second downlink data transfer provided by a second downlink connection with the second base station by using the uplink connection with the first wireless base station to include uplink data for the second wireless base station.

* * * * *